US010476698B2

(12) United States Patent
Chikkamath et al.

(10) Patent No.: US 10,476,698 B2
(45) Date of Patent: Nov. 12, 2019

(54) REDUNDENT VIRTUAL LINK AGGREGATION GROUP

(71) Applicant: AVAGO TECHNOLOGIES INTERNATIONAL SALES PTE. LIMITED, Singapore (SG)

(72) Inventors: Shivalingayya Chikkamath, Bangalore (IN); Prabu Thayalan, Bangalore (IN); Mythilikanth Raman, San Jose, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 364 days.

(21) Appl. No.: 14/662,095

(22) Filed: Mar. 18, 2015

(65) Prior Publication Data

US 2015/0271104 A1 Sep. 24, 2015

Related U.S. Application Data

(60) Provisional application No. 61/968,141, filed on Mar. 20, 2014.

(51) Int. Cl.
*H04L 12/709* (2013.01)
*H04L 12/46* (2006.01)

(52) U.S. Cl.
CPC .................. *H04L 12/4633* (2013.01)

(58) Field of Classification Search
None
See application file for complete search history.

(56) References Cited

U.S. PATENT DOCUMENTS

| 829,529 A | 8/1906 | Keathley |
| 5,390,173 A | 2/1995 | Spinney |

(Continued)

FOREIGN PATENT DOCUMENTS

| CN | 1735062 | 2/2006 |
| CN | 1777149 | 5/2006 |

(Continued)

OTHER PUBLICATIONS

Mahalingam "VXLAN: A Framework for Overlaying Virtualized Layer 2 Networks over Layer 3 Networks" Oct. 17, 2013 pp. 1-22, Sections 1, 4 and 4.1.

(Continued)

*Primary Examiner* — Gregory B Sefcheck
*Assistant Examiner* — Jenkey Van
(74) *Attorney, Agent, or Firm* — Xsensus LLP

(57) ABSTRACT

One embodiment of the present invention provides a switch. The switch includes a link aggregation module and a link management module. The link aggregation module establishes a virtual link aggregation group comprising a plurality of links coupled to the switch and one or more other switches. The plurality of links includes a first and a second sets of links coupling a first and a second end devices, respectively. The link management module determines a current mode which indicates which of the sets of links is currently active, and operates the first and the second sets of links as active and standby links, respectively, for the virtual link aggregation group based on the current mode and a port role for a port participating in the virtual link aggregation group. The port role indicates whether the port is coupled to an active link or a backup link.

21 Claims, 14 Drawing Sheets

(56) References Cited

U.S. PATENT DOCUMENTS

| | | |
|---|---|---|
| 5,802,278 A | 9/1998 | Isfeld |
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrill, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,122,639 A | 9/2000 | Babu |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,816,462 B1 | 11/2004 | Booth, III |
| 6,870,840 B1 | 3/2005 | Hill |
| 6,873,602 B1 | 3/2005 | Ambe |
| 6,920,503 B1 | 7/2005 | Nanji |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,097,308 B2 | 8/2006 | Kim et al. |
| 7,173,934 B2 | 2/2007 | Lapuh |
| 7,197,308 B2 | 3/2007 | Singhal |
| 7,206,288 B2 | 4/2007 | Cometto |
| 7,274,694 B1 | 9/2007 | Cheng |
| 7,310,664 B1 | 12/2007 | Merchant |
| 7,313,637 B2 | 12/2007 | Tanaka |
| 7,316,031 B2 | 1/2008 | Griffith |
| 7,330,897 B2 | 2/2008 | Baldwin |
| 7,380,025 B1 | 5/2008 | Riggins |
| 7,397,768 B1 | 7/2008 | Betker |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser |
| 7,571,447 B2 | 8/2009 | Ally |
| 7,599,901 B2 | 10/2009 | Mital |
| 7,653,056 B1 | 1/2010 | Dianes |
| 7,688,960 B1 | 3/2010 | Aubuchon |
| 7,690,040 B2 | 3/2010 | Frattura |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,095,774 B1 | 6/2012 | Lambeth |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Ramanathan |
| 8,301,686 B1 | 10/2012 | Appajodu |
| 8,339,994 B2 | 12/2012 | Gnanasekaran |
| 8,351,352 B1 | 1/2013 | Eastlake |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Srikrishnan |
| 8,462,774 B2 | 6/2013 | Page |
| 8,465,774 B2 | 6/2013 | Page |
| 8,520,595 B2 | 8/2013 | Yadav |
| 8,553,710 B1 | 10/2013 | White |
| 8,595,479 B2 | 11/2013 | Radhakrishnan |
| 8,599,850 B2 | 12/2013 | Jha |
| 8,599,864 B2 | 12/2013 | Chung |
| 8,615,008 B2 | 12/2013 | Natarajan |
| 8,619,788 B1 | 12/2013 | Sankaran |
| 8,625,616 B2 | 1/2014 | Vobbilisetty |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,730,963 B1 * | 5/2014 | Grosser, Jr. ............ H04L 12/462 370/219 |
| 8,792,501 B1 * | 7/2014 | Rustagi ................... H04L 45/58 370/217 |
| 8,798,045 B1 | 8/2014 | Aybay |
| 8,798,055 B1 | 8/2014 | An |
| 8,804,732 B1 | 8/2014 | Hepting |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,948,181 B2 | 2/2015 | Kapadia |
| 8,971,173 B1 | 3/2015 | Choudhury |
| 9,019,976 B2 | 4/2015 | Gupta |
| 9,178,793 B1 | 11/2015 | Marlow |
| 9,231,890 B2 | 1/2016 | Vobbilisetty |
| 9,350,680 B2 | 5/2016 | Thayalan |
| 9,401,818 B2 | 7/2016 | Venkatesh |
| 9,438,447 B2 | 9/2016 | Basso |
| 9,450,870 B2 | 9/2016 | Ananthapadmanabha |
| 9,524,173 B2 | 12/2016 | Guntaka |
| 9,626,255 B2 | 4/2017 | Guntaka |
| 9,628,407 B2 | 4/2017 | Guntaka |

(56) References Cited

U.S. PATENT DOCUMENTS

| | | |
|---|---|---|
| 2001/0005527 A1 | 6/2001 | Vaeth |
| 2001/0055274 A1 | 12/2001 | Hegge |
| 2002/0021701 A1 | 2/2002 | Lavian |
| 2002/0027885 A1 | 3/2002 | Ben-Ami |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2002/0138628 A1 | 9/2002 | Tingley |
| 2002/0161867 A1 | 10/2002 | Cochran |
| 2003/0026290 A1 | 2/2003 | Umayabashi |
| 2003/0041085 A1 | 2/2003 | Sato |
| 2003/0093567 A1 | 5/2003 | Lolayekar |
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0152075 A1 | 8/2003 | Hawthorne |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | BlanquerGonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0088668 A1 | 1/2004 | Bornowski |
| 2004/0037295 A1 | 2/2004 | Tanaka |
| 2004/0047349 A1 | 3/2004 | Fujita |
| 2004/0049699 A1 | 3/2004 | Griffith |
| 2004/0057430 A1 | 3/2004 | Paavolainen |
| 2004/0081171 A1 | 4/2004 | Finn |
| 2004/0088437 A1 | 5/2004 | Stimac |
| 2004/0095900 A1 | 5/2004 | Siegel |
| 2004/0117508 A1 | 6/2004 | Shimizu |
| 2004/0120326 A1 | 6/2004 | Yoon |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0025179 A1 | 2/2005 | McLaggan |
| 2005/0036488 A1 | 2/2005 | Kalkunte |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0111352 A1 | 5/2005 | Ho |
| 2005/0122979 A1 | 6/2005 | Gross |
| 2005/0152335 A1 | 7/2005 | Lodha |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265330 A1* | 12/2005 | Suzuki ............... H04L 49/555 370/389 |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0039366 A1 | 2/2006 | Ghosh |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0093254 A1 | 4/2006 | Ge |
| 2006/0092860 A1 | 5/2006 | Higashitaniguchi |
| 2006/0098589 A1 | 5/2006 | Kreeger |
| 2006/0126511 A1 | 6/2006 | Youn |
| 2006/0140130 A1 | 6/2006 | Kalkunte |
| 2006/0155828 A1 | 7/2006 | Ikeda |
| 2006/0168109 A1 | 7/2006 | Warmenhoven |
| 2006/0184937 A1 | 8/2006 | Abels |
| 2006/0206655 A1 | 9/2006 | Chappell |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | Desanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0061817 A1 | 3/2007 | Atkinson |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0110068 A1 | 5/2007 | Sekiguchi |
| 2007/0116224 A1 | 5/2007 | Burke |
| 2007/0116422 A1 | 5/2007 | Reynolds |
| 2007/0121617 A1 | 5/2007 | Kanekar |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0183393 A1 | 8/2007 | Boyd |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0230472 A1 | 10/2007 | Jesuraj |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2007/0297406 A1 | 12/2007 | Rooholamini |
| 2008/0052487 A1 | 2/2008 | Akahane |
| 2008/0056135 A1 | 3/2008 | Lee |
| 2008/0056300 A1 | 3/2008 | Williams |
| 2008/0057918 A1 | 3/2008 | Abrant |
| 2008/0065760 A1 | 3/2008 | Damm |
| 2008/0075078 A1 | 3/2008 | Watanabe |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0133762 A1 | 6/2008 | Berkvens |
| 2008/0159260 A1 | 7/2008 | Vobbilisetty |
| 2008/0159277 A1 | 7/2008 | Vobbilisetty |
| 2008/0165705 A1 | 7/2008 | Umayabashi |
| 2008/0172492 A1 | 7/2008 | Raghunath |
| 2008/0181196 A1* | 7/2008 | Regan ................... H04L 45/00 370/351 |
| 2008/0186968 A1 | 8/2008 | Farinacci |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |

(56) References Cited

U.S. PATENT DOCUMENTS

| | | |
|---|---|---|
| 2008/0240129 A1 | 10/2008 | Elmeleegy |
| 2008/0253380 A1 | 10/2008 | Cazares |
| 2008/0267179 A1 | 10/2008 | Lavigne |
| 2008/0279196 A1 | 11/2008 | Friskney |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0304519 A1 | 12/2008 | Koenen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0037977 A1 | 2/2009 | Gai |
| 2009/0041046 A1 | 2/2009 | Hirata |
| 2009/0042270 A1 | 2/2009 | Dolly |
| 2009/0044270 A1 | 2/2009 | Shelly |
| 2009/0052326 A1 | 2/2009 | Bergamasco |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0129389 A1 | 5/2009 | Halna DeFretay |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0213867 A1 | 8/2009 | Devireddy |
| 2009/0222879 A1 | 9/2009 | Kostal |
| 2009/0225752 A1* | 9/2009 | Mitsumori ............ H04L 45/245 370/390 |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0279701 A1 | 11/2009 | Moisand |
| 2009/0292858 A1 | 11/2009 | Lambeth |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2010/0002382 A1 | 1/2010 | Aybay |
| 2010/0027420 A1 | 2/2010 | Smith |
| 2010/0027429 A1 | 2/2010 | Jorgens |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0085981 A1 | 4/2010 | Gupta |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0192225 A1 | 7/2010 | Ma |
| 2010/0195489 A1 | 8/2010 | Zhou |
| 2010/0195529 A1 | 8/2010 | Liu |
| 2010/0214913 A1 | 8/2010 | Kompella |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0246580 A1 | 9/2010 | Kaganoi |
| 2010/0254703 A1 | 10/2010 | Kirkpatrick |
| 2010/0257263 A1 | 10/2010 | Casado |
| 2010/0258263 A1 | 10/2010 | Douxchamps |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290472 A1* | 11/2010 | Raman ................. H04L 45/00 370/395.2 |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0316055 A1 | 12/2010 | Belanger |
| 2010/0329110 A1 | 12/2010 | Rose |
| 2010/0329265 A1 | 12/2010 | Lapuh |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085557 A1 | 4/2011 | Gnanasekaran |
| 2011/0085560 A1 | 4/2011 | Chawla |
| 2011/0085562 A1* | 4/2011 | Bao ................... H04L 45/00 370/401 |
| 2011/0085563 A1 | 4/2011 | Kotha |
| 2011/0088011 A1 | 4/2011 | Ouali |
| 2011/0110266 A1 | 5/2011 | Li |
| 2011/0134802 A1 | 6/2011 | Rajagopalan |
| 2011/0134803 A1 | 6/2011 | Dalvi |
| 2011/0134924 A1 | 6/2011 | Hewson |
| 2011/0134925 A1 | 6/2011 | Safrai |
| 2011/0142053 A1 | 6/2011 | Van |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |

(56) References Cited

U.S. PATENT DOCUMENTS

| | | |
|---|---|---|
| 2011/0194403 A1 | 8/2011 | Sajassi |
| 2011/0194563 A1 | 8/2011 | Shen |
| 2011/0225540 A1 | 9/2011 | d'Entremont |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0055274 A1 | 12/2011 | Hegge |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob |
| 2012/0033668 A1* | 2/2012 | Humphries ............ H04L 12/185 370/390 |
| 2012/0033669 A1 | 2/2012 | Mohandas |
| 2012/0033672 A1 | 2/2012 | Page |
| 2012/0039163 A1 | 2/2012 | Nakajima |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1 | 7/2012 | Berman |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243359 A1 | 9/2012 | Keesara |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0281700 A1 | 11/2012 | Koganti |
| 2012/0287785 A1 | 11/2012 | Kamble |
| 2012/0294192 A1 | 11/2012 | Masood |
| 2012/0294194 A1 | 11/2012 | Balasubramanian |
| 2012/0230800 A1 | 12/2012 | Kamble |
| 2012/0320739 A1* | 12/2012 | Kamath ............... H04L 45/66 370/225 |
| 2012/0320800 A1 | 12/2012 | Kamble |
| 2012/0327766 A1 | 12/2012 | Tsai et al. |
| 2013/0003535 A1 | 1/2013 | Sarwar |
| 2013/0003549 A1 | 1/2013 | Matthews |
| 2013/0003608 A1 | 1/2013 | Lei |
| 2013/0003737 A1 | 1/2013 | Sinicrope |
| 2013/0003738 A1 | 1/2013 | Koganti |
| 2013/0003747 A1 | 1/2013 | Raman |
| 2013/0016606 A1 | 1/2013 | Cirkovic |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0034094 A1 | 2/2013 | Cardona |
| 2013/0044629 A1 | 2/2013 | Biswas |
| 2013/0058354 A1 | 3/2013 | Casado |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane et al. |
| 2013/0121142 A1 | 5/2013 | Bai |
| 2013/0124707 A1 | 5/2013 | Ananthapadmanabha |
| 2013/0124750 A1 | 5/2013 | Anumala |
| 2013/0127848 A1 | 5/2013 | Joshi |
| 2013/0132296 A1 | 5/2013 | Talagala |
| 2013/0135811 A1 | 5/2013 | Dunwoody |
| 2013/0136123 A1 | 5/2013 | Ge |
| 2013/0145008 A1 | 6/2013 | Kannan |
| 2013/0148546 A1 | 6/2013 | Eisenhauer |
| 2013/0148663 A1 | 6/2013 | Xiong |
| 2013/0156425 A1 | 6/2013 | Kirkpatrick |
| 2013/0163591 A1 | 6/2013 | Shukla |
| 2013/0194914 A1 | 8/2013 | Agarwal |
| 2013/0201992 A1 | 8/2013 | Masaki |
| 2013/0215754 A1 | 8/2013 | Tripathi |
| 2013/0219473 A1 | 8/2013 | Schaefer |
| 2013/0223221 A1 | 8/2013 | Xu |
| 2013/0223438 A1 | 8/2013 | Tripathi |
| 2013/0223449 A1 | 8/2013 | Koganti |
| 2013/0238802 A1 | 9/2013 | Sarikaya |
| 2013/0250289 A1* | 9/2013 | Kettler .................. G01J 3/50 356/243.1 |
| 2013/0250947 A1 | 9/2013 | Zheng |
| 2013/0250951 A1 | 9/2013 | Koganti |
| 2013/0250958 A1 | 9/2013 | Watanabe |
| 2013/0259037 A1 | 10/2013 | Natarajan |
| 2013/0259047 A1* | 10/2013 | Bhagavathiperumal ..................... H04L 12/6418 370/392 |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Chandra |
| 2013/0301642 A1 | 11/2013 | Radhakrishnan |
| 2013/0308492 A1 | 11/2013 | Baphna |
| 2013/0308641 A1 | 11/2013 | Ackley |
| 2013/0308647 A1 | 11/2013 | Rosset |
| 2013/0315125 A1 | 11/2013 | Ravishankar |
| 2013/0315246 A1 | 11/2013 | Zhang |
| 2013/0315586 A1 | 11/2013 | Kipp |
| 2013/0322427 A1 | 12/2013 | Stiekes |
| 2013/0329605 A1 | 12/2013 | Nakil |
| 2013/0332660 A1 | 12/2013 | Talagala |
| 2013/0336104 A1 | 12/2013 | Talla |

(56) References Cited

U.S. PATENT DOCUMENTS

| | | |
|---|---|---|
| 2013/0346583 A1 | 12/2013 | Low |
| 2014/0010239 A1 | 1/2014 | Xu |
| 2014/0013324 A1 | 1/2014 | Zhang |
| 2014/0019608 A1 | 1/2014 | Kawakami |
| 2014/0019639 A1 | 1/2014 | Ueno |
| 2014/0025736 A1 | 1/2014 | Wang |
| 2014/0029412 A1 | 1/2014 | Janardhanan |
| 2014/0029419 A1 | 1/2014 | Jain |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1 | 3/2014 | Janardhanan |
| 2014/0086253 A1 | 3/2014 | Yong |
| 2014/0092738 A1 | 4/2014 | Grandhi |
| 2014/0105034 A1 | 4/2014 | Huawei |
| 2014/0112122 A1 | 4/2014 | Kapadia |
| 2014/0140243 A1 | 5/2014 | Ashwood-Smith |
| 2014/0157251 A1 | 6/2014 | Hocker |
| 2014/0169368 A1 | 6/2014 | Grover |
| 2014/0188996 A1 | 7/2014 | Lie |
| 2014/0192804 A1 | 7/2014 | Ghanwani |
| 2014/0195694 A1* | 7/2014 | Sait ............... H04L 45/18 709/239 |
| 2014/0195695 A1 | 7/2014 | Okita |
| 2014/0198656 A1* | 7/2014 | Venkatesh ......... H04L 47/125 370/235 |
| 2014/0211607 A1* | 7/2014 | Li ................. H04L 49/552 370/219 |
| 2014/0241147 A1 | 8/2014 | Rajagopalan |
| 2014/0258446 A1 | 9/2014 | Bursell |
| 2014/0269701 A1 | 9/2014 | Kaushik |
| 2014/0269709 A1 | 9/2014 | Benny |
| 2014/0269720 A1 | 9/2014 | Arvindinivasan |
| 2014/0269733 A1 | 9/2014 | Venkatesh |
| 2014/0298091 A1 | 10/2014 | Carlen |
| 2014/0348168 A1 | 11/2014 | Singh |
| 2014/0355477 A1 | 12/2014 | Moopath |
| 2014/0362854 A1 | 12/2014 | Addanki |
| 2014/0362859 A1 | 12/2014 | Addanki |
| 2014/0376550 A1 | 12/2014 | Khan |
| 2015/0009992 A1 | 1/2015 | Zhang |
| 2015/0010007 A1 | 1/2015 | Matsuhira |
| 2015/0016300 A1 | 1/2015 | Devireddy |
| 2015/0030031 A1 | 1/2015 | Zhou |
| 2015/0092593 A1 | 4/2015 | Kompella |
| 2015/0103826 A1 | 4/2015 | Davis |
| 2015/0110105 A1* | 4/2015 | Kapur ............... H04L 45/245 370/389 |
| 2015/0110111 A1 | 4/2015 | Song |
| 2015/0110487 A1 | 4/2015 | Fenkes |
| 2015/0117256 A1 | 4/2015 | Sabaa |
| 2015/0117454 A1 | 4/2015 | Koponen |
| 2015/0124837 A1* | 5/2015 | Saltsidis ........... H04L 47/827 370/419 |
| 2015/0127618 A1 | 5/2015 | Alberti |
| 2015/0139037 A1* | 5/2015 | Li ................. H04L 41/0886 370/255 |
| 2015/0139234 A1 | 5/2015 | Hu |
| 2015/0143369 A1 | 5/2015 | Zheng |
| 2015/0172098 A1 | 6/2015 | Agarwal |
| 2015/0188753 A1 | 7/2015 | Anumala |
| 2015/0188770 A1 | 7/2015 | Naiksatam |
| 2015/0195093 A1 | 7/2015 | Ramasubramani |
| 2015/0222506 A1 | 8/2015 | Kizhakkiniyil |
| 2015/0248298 A1 | 9/2015 | Gavrilov |
| 2015/0263897 A1 | 9/2015 | Ganichev |
| 2015/0263899 A1 | 9/2015 | Tubaltsev |
| 2015/0263991 A1 | 9/2015 | MacChiano |
| 2015/0271088 A1* | 9/2015 | Ao ................... H04L 47/41 370/276 |
| 2015/0281066 A1 | 10/2015 | Koley |
| 2015/0301901 A1 | 10/2015 | Rath |
| 2015/0347468 A1 | 12/2015 | Bester |
| 2015/0365320 A1* | 12/2015 | Xu ................... H04L 45/245 370/226 |
| 2016/0072899 A1 | 3/2016 | Tung |
| 2016/0087885 A1 | 3/2016 | Tripathi |
| 2016/0139939 A1 | 5/2016 | Bosch |
| 2016/0182458 A1 | 6/2016 | Shatzkamer |
| 2016/0212040 A1 | 7/2016 | Bhagavathiperumal |
| 2016/0344640 A1 | 11/2016 | Derlund |
| 2017/0012880 A1 | 1/2017 | Yang |
| 2017/0026197 A1 | 1/2017 | Venkatesh |
| 2017/0097841 A1 | 4/2017 | Chang |
| 2018/0013614 A1 | 1/2018 | Vobbilisetty |

FOREIGN PATENT DOCUMENTS

| | | |
|---|---|---|
| CN | 101064682 | 10/2007 |
| CN | 101459618 | 6/2009 |
| CN | 101471899 | 7/2009 |
| CN | 101548511 | 9/2009 |
| CN | 101645880 | 2/2010 |
| CN | 102098237 | 6/2011 |
| CN | 102148749 | 8/2011 |
| CN | 102301663 | 12/2011 |
| CN | 102349268 | 2/2012 |
| CN | 102378176 | 3/2012 |
| CN | 102404181 | 4/2012 |
| CN | 102415065 | 4/2012 |
| CN | 102415065 A | 4/2012 |
| CN | 102801599 | 11/2012 |
| CN | 102801599 A | 11/2012 |
| CN | 102088388 | 4/2014 |
| EP | 0579567 | 5/1993 |
| EP | 0579567 A2 | 1/1994 |
| EP | 0993156 | 4/2000 |
| EP | 0993156 A2 | 12/2000 |
| EP | 1398920 | 3/2004 |
| EP | 1398920 A2 | 3/2004 |
| EP | 2001167 A1 | 8/2007 |
| EP | 1916807 A2 | 4/2008 |
| EP | 2854352 | 4/2015 |
| EP | 2874359 | 5/2015 |
| WO | 2008056838 | 5/2008 |
| WO | 2009042919 | 4/2009 |
| WO | 2010111142 | 9/2010 |
| WO | 2010111142 A1 | 9/2010 |
| WO | 2011132568 | 10/2011 |
| WO | 2011140028 | 11/2011 |
| WO | 2011140028 A1 | 11/2011 |
| WO | 2012033663 | 3/2012 |
| WO | 2012093429 | 7/2012 |
| WO | 2014031781 | 2/2014 |

OTHER PUBLICATIONS

Office action dated Apr. 30, 2015, U.S. Appl. No. 13/351,513, filed Jan. 17, 2012.

Office Action dated Apr. 1, 2015, U.S. Appl. No. 13/656,438, filed Oct. 19, 2012.

Office Action dated May 21, 2015, U.S. Appl. No. 13/288,822, filed Nov. 3, 2011.

Siamak Azodolmolky et al. "Cloud computing networking: Challenges and opportunities for innovations", IEEE Communications Magazine, vol. 51, No. 7, Jul. 1, 2013.

Office action dated Jun. 8, 2015, U.S. Appl. No. 14/178,042, filed Feb. 11, 2014.

Office Action dated Jun. 10, 2015, U.S. Appl. No. 13/890,150, filed May 8, 2013.

Office Action dated Jun. 18, 2015, U.S. Appl. No. 13/098,490, filed May 2, 2011.

Office Action dated Jun. 16, 2015, U.S. Appl. No. 13/048,817, filed Mar. 15, 2011.

Open Flow Configuration and Management Protocol 1.0 (OF-Config 1.0) Dec. 23, 2011.

Open Flow Switch Specification Version 1.2 Dec. 5, 2011.

Office action dated Feb. 2, 2016, U.S. Appl. No. 13/092,460, filed Apr. 22, 2011.

(56) References Cited

OTHER PUBLICATIONS

Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Eastlake, D. et al., 'RBridges: TRILL Header Options', Dec. 24, 2009, pp. 1-17, TRILL Working Group.
Perlman, Radia et al., 'RBridge VLAN Mapping', TRILL Working Group, Dec. 4, 2009, pp. 1-12.
Touch, J. et al., 'Transparent Interconnection of Lots of Links (TRILL): Problem and Applicability Statement', May 2009, Network Working Group, pp. 1-17.
'RBridges: Base Protocol Specification', IETF Draft, Perlman et al., Jun. 26, 2009.
Switched Virtual Networks. 'Internetworking Moves Beyond Bridges and Routers' Data Communications, McGraw Hill. New York, US, vol. 23, No. 12, Sep. 1, 1994 (Sep. 1, 1994), pp. 66-70,72,74, XP000462385 ISSN: 0363-6399.
Office Action dated Apr. 9, 2014, U.S. Appl. No. 13/092,724, filed Apr. 22, 2011.
Office action dated Aug. 29, 2014, U.S. Appl. No. 13/042,259, filed Mar. 7, 2011.
Office Action dated Mar. 14, 2014,U.S. Appl. No. 13/092,460, filed Apr. 22, 2011.
Office Action dated Mar. 26, 2014, U.S. Appl. No. 13/092,701, filed Apr. 22, 2011.
Office Action dated Apr. 9, 2014, U.S. Appl. No. 13/092,752, filed Apr. 22, 2011.
Office action dated Aug. 21, 2014, U.S. Appl. No. 13/184,526, filed Jul. 16, 2011.
Office Action dated Mar. 6, 2014, U.S. Appl. No. 13/425,238, filed Mar. 20, 2012.
Office Action dated Jun. 18, 2014, U.S. Appl. No. 13/440,861, filed Apr. 5, 2012.
Office Action dated Feb. 28, 2014, U.S. Appl. No. 13/351,513, filed Jan. 17, 2012.
Office Action dated May 9, 2014, U.S. Appl. No. 13/484,072, filed May 30, 2012.
Office Action dated May 14, 2014, U.S. Appl. No. 13/533,843, filed Jun. 26, 2012.
Office Action dated Feb. 20, 2014, U.S. Appl. No. 13/598,204, filed Aug. 29, 2012.
Office Action dated Jun. 6, 2014, U.S. Appl. No. 13/669,357, filed Nov. 5, 2012.
Brocade, 'Brocade Fabrics OS (FOS) 6.2 Virtual Fabrics Feature Frequently Asked Questions', pp. 1-6, 2009 Brocade Communications Systems, Inc.
Brocade, 'FastIron and TurboIron 24x Configuration Guide', Feb. 16, 2010.
Brocade, 'The Effortless Network: Hyperedge Technology for the Campus LAN' 2012.
Brocade 'An Introduction to Brocade VCS Fabric Technology', Dec. 3, 2012.
Christensen, M. et al., 'Considerations for Internet Group Management Protocol (IGMP) and Multicast Listener Discovery (MLD) Snooping Switches', May 2006.
FastIron Configuration Guide Supporting Ironware Software Release 07.0.00, Dec. 18, 2009.
Foundary FastIron Configuration Guide, Software Release FSX 04.2.00b, Software Release FWS 04.3.00, Software Release FGS 05.0.00a, Sep. 2008.
Huang, Nen-Fu et al., 'An Effective Spanning Tree Algorithm for a Bridged LAN', Mar. 16, 1992.
Knight, 'Network Based IP VPN Architecture using Virtual Routers', May 2003.
Knight P et al: 'Layer 2 and 3 Virtual Private Networks: Taxonomy, Technology, and Standardization Efforts', IEEE, Communications Magazine; IEEE Service Center, Piscataway, US, vol. 42, No. 6, Jun. 1, 2004 (Jun. 1, 2004), pp. 124-131, XP001198207, ISSN: 0163-6804, DOI: 1031109/MCOM.200431304248.
Knight S et al: 'Virtual Router Redundancy Protocol' Internet Citation Apr. 1, 1998 (Apr. 1, 1998), XP002135272 Retrieved from the Internet: URL:ftp://ftp.isi.edu/in-notes/rfc2338.txt [retrieved on Apr. 10, 2000].
Lapuh, Roger et al., 'Split Multi-link Trunking (SMLT)', draft-lapuh-network-smlt-08, Jul. 2008.
Lapuh, Roger et al., 'Split Multi-Link Trunking (SMLT)', Network Working Group, Oct. 2012.
Louati, Wajdi et al., 'Network-based virtual personal overlay networks using programmable virtual routers', IEEE Communications Magazine, Jul. 2005.
Narten, T. et al., 'Problem Statement: Overlays for Network Virtualization d raft-narten-n vo3-over l ay-problem-statement-01', Oct. 31, 2011.
Office Action for U.S. Appl. No. 13/042,259, filed Mar. 7, 2011, from Jaroenchonwanit, Bunjob, dated Jan. 16, 2014.
Office Action for U.S. Appl. No. 13/092,752, filed Apr. 22, 2011, from Park, Jung H., dated Jul. 18, 2013.
Office Action for U.S. Appl. No. 13/365,993, filed Feb. 3, 2012, from Cho, Hong Sol., dated Jul. 23, 2013.
Office Action for U.S. Appl. No. 12/725,249, filed Mar. 16, 2010, dated Apr. 26, 2013.
Office Action for U.S. Appl. No. 12/725,249, filed Mar. 16, 2010, dated Sep. 12, 2012.
Office Action for U.S. Appl. No. 12/950,968, filed Nov. 19, 2010, dated Jan. 4, 2013.
Office Action for U.S. Appl. No. 12/950,968, filed Nov. 19, 2010, dated Jun. 7, 2012.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/030,688, filed Feb. 18, 2011, dated Apr. 25, 2013.
Office Action for U.S. Appl. No. 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/042,259, filed Mar. 7, 2011, dated Mar. 18, 2013.
Office Action for U.S. Appl. No. 13/042,259, filed Mar. 7, 2011, dated Jul. 31, 2013.
Office Action for U.S. Appl. No. 13/044,301, filed Mar. 9, 2011, dated Feb. 22, 2013.
Office Action for U.S. Appl. No. 13/044,301, filed Mar. 9, 2011, dated Jun. 11, 2013.
Office Action for U.S. Appl. No. 13/044,326, filed Mar. 9, 2011, dated Oct. 2, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No. 13/087,239, filed Apr. 14, 2011, dated May 22, 2013.
Office Action for U.S. Appl. No. 13/092,460, filed Apr. 22, 2011, dated Jun. 21, 2013.

(56) References Cited

OTHER PUBLICATIONS

Office Action for U.S. Appl. No. 13/092,580, filed Apr. 22, 2011, dated Jun. 10, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,752, filed Apr. 22, 2011, dated Feb. 5, 2013.
Office Action for U.S. Appl. No. 13/092,864, filed Apr. 22, 2011, dated Sep. 19, 2012.
Office Action for U.S. Appl. No. 13/092,873, filed Apr. 22, 2011, dated Jun. 19, 2013.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 13/098,360, filed Apr. 29, 2011, dated May 31, 2013.
Office Action for U.S. Appl. No. 13/098,490, filed May 2, 2011, dated Dec. 21, 2012.
Office Action for U.S. Appl. No. 13/098,490, filed May 2, 2011, dated Mar. 27, 2014.
Office Action for U.S. Appl. No. 13/098,490, filed May 2, 2011, dated Jul. 9, 2013.
Office Action for U.S. Appl. No. 13/184,526, filed Jul. 16, 2011, dated Jan. 28, 2013.
Office Action for U.S. Appl. No. 13/184,526, filed Jul. 16, 2011, dated May 22, 2013.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/533,843, filed Jun. 26, 2012, dated Oct. 21, 2013.
Office Action for U.S. Appl. No. 13/598,204, filed Aug. 29, 2012, dated Feb. 20, 2014.
Perlman, Radia et al., 'Challenges and Opportunities in the Design of TRILL: a Routed layer 2 Technology', 2009.
Perlman, Radia et al., 'RBridges: Base Protocol Specification; Draft-ietf-trill-rbridge-protocol-16.txt', Mar. 3, 2010, pp. 1-117.
S. Nadas et al., 'Virtual Router Redundancy Protocol (VRRP) Version 3 for IPv4 and IPv6', Internet Engineering Task Force, Mar. 2010.
Zhai F. Hu et al. 'RBridge: Pseudo-Nickname; draft-hu-trill-pseudonode-nickname-02.txt', May 15, 2012.
'An Introduction to Brocade VCS Fabric Technology', BROCADE white paper, http://community.brocade.com/docs/DOC-2954, Dec. 3, 2012.
U.S. Appl. No. 13/030,806 Office Action dated Dec. 3, 2012.
Office action dated Jan. 10, 2014, U.S. Appl. No. 13/092,580, filed Apr. 22, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jan. 6, 2014, U.S. Appl. No. 13/092,877, filed Apr. 22, 2011.
Office action dated Oct. 2, 2013, U.S. Appl. No. 13/044,326, filed Mar. 9, 2011.
Office action dated Dec. 2, 2013, U.S. Appl. No. 13/184,526, filed Jul. 16, 2011.
Office action dated Nov. 29, 2013, U.S. Appl. No. 13/092,873, filed Apr. 22, 2011.
Office action dated Nov. 12, 2013, U.S. Appl. No. 13/312,903, filed Dec. 6, 2011.
Brocade 'Brocade Unveils 'The Effortless Network'', http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Office Action for U.S. Appl. No. 13/365,808, filed Jul. 18, 2013, dated Jul. 18, 2013.
Office Action for U.S. Appl. No. 13/092,887 dated Jan. 6, 2014.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/040,2259, filed Mar. 7, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.

(56) References Cited

OTHER PUBLICATIONS

Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Lapuh, Roger et al., 'Split Multi-link Trunking (SMLT) draft-lapuh-network-smlt-08', Jan. 2009.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, from Haile, Awet A., dated Dec. 2, 2012.
Office Action for U.S. Appl. No. 13/087,239, filed Apr. 14, 2011, dated Dec. 5, 2012.
Office Action for U.S. Appl. No. 13/351,513, filed Jan. 17, 2012, dated Feb. 28, 2014.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009 (Nov. 30, 2009), pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Rosen, E. et al., "BGP/MPLS VPNs", Mar. 1999.
Office Action for U.S. Appl. No. 14/577,785, filed Dec. 19, 2014, dated Apr. 13, 2015.
Office Action for U.S. Appl. No. 13/425,238, filed Mar. 20, 2012, dated Mar. 12, 2015.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.
Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.
Office Action dated 06/18/215, U.S. Appl. No. 13/098,490, filed May 2, 2011.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Office Action dated Jun. 13, 2018, U.S. Appl. No. 13/786,328, filed Mar. 5, 2013.
IEEE et al., "Amendment to Carrier Sense Multiple Access with Collision Detection (CSMA/CD) Access Method and Physical Layer Specifications—Aggregation of Multiple Link Segments", Mar. 30, 2000, IEEE Computer Society, IEEE Std 802.3ad-2000, pp. 116-117.

(56) References Cited

OTHER PUBLICATIONS

Office Action dated Jul. 13, 2018, U.S. Appl. No. 15/402,924, filed Jul. 13, 2018.
Office Action dated Jul. 24, 2018, U.S. Appl. No. 14/799,371, filed Jul. 24, 2018.
Office Action for U.S. Appl. No. 14/216,292, dated Oct. 6, 2017.
Office Action dated Oct. 25, 2017, U.S. Appl. No. 14/867,865, filed Sep. 28, 2015.
Office action dated Oct. 26, 2017, U.S. Appl. No. 14/817,097, filed Aug. 3, 2015.
Office Action dated Mar. 20, 2018, U.S. Appl. No. 14/867,865, filed Sep. 28, 2015.
Office Action for U.S. Appl. No. 14/817,097 dated May 4, 2017.
Office Action for U.S. Appl. No. 14/872,966, dated Apr. 20, 2017.
Office Action for U.S. Appl. No. 14/680,915, dated May 3, 2017.
Office Action for U.S. Appl. No. 14/792,166, dated Apr. 26, 2017.
Office Action for U.S. Appl. No. 14/510, 913, dated Jun. 30, 2017.
Office Action for U.S. Appl. No. 15/005,946, dated Jul. 14, 2017.
Office Action for U.S. Appl. No. 13/092,873, dated Jul. 19, 2017.
Office Action for U.S. Appl. No. 15/047,539, dated Aug. 7, 2017.
Office Action for U.S. Appl. No. 14/830,035, dated Aug. 28, 2017.
Office Action for U.S. Appl. No. 13/098,490, dated Aug. 24, 2017.
Office Action for U.S. Appl. No. 13/786,328, dated Aug. 21, 2017.
Office Action for U.S. Appl. No. 14/660,803, dated May 17, 2017.
Office Action for U.S. Appl. No. 14/488,173, dated May 12, 2017.
Office Action for U.S. Appl. No. 13/288,822, dated May 26, 2017.
Office Action for U.S. Appl. No. 14/329,447, dated Jun. 8, 2017.
"Network based IP VPN Architecture using Virtual Routers" Paul Knight et al.
Yang Yu et al "A Framework of using OpenFlow to handle transient link failure", TMEE, 2011 International Conference on, IEEE, Dec. 16, 2011.
Office Action for U.S. Appl. No. 15/227,789, dated Feb. 27, 2017.
Office Action for U.S. Appl. No. 14/822,380, dated Feb. 8, 2017.
Office Action for U.S. Appl. No. 14/704,660, dated Feb. 27, 2017.
Office Action for U.S. Appl. No. 14/510,913, dated Mar. 3, 2017.
Office Action for U.S. Appl. No. 14/473,941, dated Feb. 8, 2017.
Office Action for U.S. Appl. No. 14/329,447, dated Feb. 10, 2017.
Office Action for U.S. Appl. No. 14/662,095, dated Mar. 24, 2017.
Office Action for U.S. Appl. No. 15/005,967, dated Mar. 31, 2017.
Office Action for U.S. Appl. No. 15/215,377, dated Apr. 7, 2017.
Office Action for U.S. Appl. No. 13/098,490, dated Apr. 6, 2017.
Office Action for U.S. Appl. No., 14/662,092, dated Mar. 29. 2017.

* cited by examiner

RVLAG DATABASE 142

| PORT ID 201 | SWITCH ID 202 | PORT ROLE 203 | PORT FLAG 204 | PORT STATUS 205 |
|---|---|---|---|---|
| 161 | 151 | ACTIVE | ALL_ACK | SELECTED |
| 165 | 153 | ACTIVE | X | SELECTED |
| 164 | 152 | BACKUP | X | STANDBY |
| 166 | 153 | BACKUP | X | STANDBY |

FIG. 5B

RVLAG DATABASE 142

| PORT ID 201 | SWITCH ID 202 | PORT ROLE 203 | PORT FLAG 204 | PORT STATUS 205 |
|---|---|---|---|---|
| 161 | 151 | ACTIVE | ALL_ACK | STANDBY |
| 164 | 152 | BACKUP | X | SELECTED |
| 166 | 153 | BACKUP | X | SELECTED |

FIG. 5C

RVLAG DATABASE 142

| PORT ID 201 | SWITCH ID 202 | PORT ROLE 203 | PORT FLAG 204 | PORT STATUS 205 |
|---|---|---|---|---|
| 161 | 151 | ACTIVE | ALL_ACK | SELECTED |
| 162 | 151 | ACTIVE | ALL_ACK | SELECTED |
| 163 | 152 | ACTIVE | X | SELECTED |
| 164 | 152 | BACKUP | X | STANDBY |
| 166 | 153 | BACKUP | X | STANDBY |

FIG. 5D

REDUNDENT VIRTUAL LINK AGGREGATION GROUP

RELATED APPLICATION

This application claims the benefit of U.S. Provisional Application No. 61/968,141, titled "Distributed Active-Passive redundancy in vLAG," by inventors Shivalingayya Chikkamath, Prabu Thayalan, and Mythilikanth Raman, filed 20 Mar. 2014; and U.S. Provisional Application No. 61/975,625, titled "Distributed Active-Passive redundancy in vLAG," by inventors Shivalingayya Chikkamath, Prabu Thayalan, and Mythilikanth Raman, filed 4 Apr. 2014, the disclosures of which are incorporated by reference herein.

The present disclosure is related to U.S. Pat. No. 8,867,552, Ser. No. 13/087,239, titled "Virtual Cluster Switching," by inventors Suresh Vobbilisetty and Dilip Chatwani, issued 21 Oct. 2014; and U.S. Pat. No. 8,665,886, Ser. No. 12/725,249, titled "Redundant Host Connection in a Routed Network," by inventors Somesh Gupta, Anoop Ghanwani, Phanidhar Koganti, and Shunjia Yu, issued 4 Mar. 2014, the disclosures of which are incorporated by reference herein.

BACKGROUND

Field

The present disclosure relates to network management. More specifically, the present disclosure relates to a method and system for facilitating device-level redundancy in a link aggregation group.

Related Art

The relentless growth of the Internet has brought with it an insatiable demand for bandwidth. As a result, equipment vendors race to build larger, faster, and more versatile switches to move traffic. However, the size of a switch cannot grow infinitely. It is limited by physical space, power consumption, and design complexity, to name a few factors. More importantly, because an overly large system often does not provide economy of scale due to its complexity, simply increasing the size and throughput of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 and layer-3 (e.g., Ethernet and Internet Protocol (IP), respectively) switching technologies continue to evolve. IP facilitates routing and end-to-end data transfer in wide area networks (WANs) while providing safeguards for error-free communication. On the other hand, more routing-like functionalities are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

As more mission-critical applications are being implemented in data communication networks, high-availability operation is becoming progressively more important as a value proposition for network architects. It can be desirable to divide a conventional aggregated link (from one device to another) among multiple network devices, often belonging to different fabric switches, such that unavailability of one fabric switch would not affect the operation of the multi-homed device.

While a link aggregation brings many desirable features to a network, some issues remain unsolved in facilitating device-level redundancy in a virtual link aggregation group. Particularly, when a plurality of member switches of a fabric switch couple both active and standby end devices via a virtual link aggregation group, existing technologies do not provide a scalable and flexible solution that takes full advantage of the virtual link aggregation group.

SUMMARY

One embodiment of the present invention provides a switch. The switch includes a link aggregation module and a link management module. The link aggregation module establishes a virtual link aggregation group comprising a plurality of links coupled to the switch and one or more other switches. The plurality of links includes a first set of links coupling a first end device and a second set of links coupling a second end device. The link management module determines a current mode, which indicates which of the sets of links is currently active, of the virtual link aggregation group. The link management module operates the first set of links as active links carrying traffic for the virtual link aggregation group and the second set of links as standby links for the first set of links based on the current mode and a port role of a port participating in the virtual link aggregation group. The port role indicates whether the port is coupled to an active link or a backup link.

In a variation on this embodiment, the link aggregation module identifies an acknowledgment of a notification message from a remote switch of the other switches. The notification message includes port information associated with a local port participating in the virtual link aggregation group. Upon receiving the acknowledgment from a respective of the other switches, the link management module selects the first or second set of links for actively carrying traffic.

In a variation on this embodiment, the link management module determines the current mode by comparing a respective number of operational links in the first and second set of links with a protection threshold value.

In a further variation, the comparison comprises determining whether the number of operational links in one of the sets of links is lower than the protection threshold value and whether the number of operational links in another of the sets of links is greater than or equal to the protection threshold value.

In a variation on this embodiment, the link aggregation module maintains a database for the virtual link aggregation group. A respective entry in the database is associated with a port participating the virtual link aggregation group and includes a port role for the port.

In a further variation, if the port role indicates that the port is coupled to an active link and the current mode indicates that the first set of links is actively carrying traffic, the link management module marks the entry as selected to carry traffic.

In a further variation, if the port role indicates that the port is coupled to an active link and the current mode indicates that the second set of links is actively carrying traffic, the link management module marks the entry as standby.

In a variation on this embodiment, the current mode indicates that the second set of links is currently active. The link management module then operates the second set of links as active links carrying traffic for the virtual link aggregation group.

In a variation on this embodiment, the virtual link aggregation group is represented as a virtual switch identifier associated with the switch and the other switches.

In a further variation, the switch also includes a forwarding module which determines whether a local port participating in the virtual link aggregation group is coupled to a link carrying traffic for the virtual link aggregation group. If the port is coupled to a link carrying traffic, the forwarding module determines the port as an egress port of a packet, which is encapsulated in a header with the virtual switch identifier as the egress switch identifier.

In a further variation, if no local port is coupled to an operational link carrying traffic for the virtual link aggregation group, the forwarding module determines an inter-switch port as an egress port for the packet. The inter-switch port is associated with one of the other switches.

In a variation on this embodiment, the switch and the other switches are member switches of an Ethernet fabric switch, wherein the Ethernet fabric switch operates as a single Ethernet switch.

BRIEF DESCRIPTION OF THE FIGURES

FIG. 5B illustrates an exemplary data structure with selected active links in a redundant virtual link aggregation group in response to a failure, in accordance with an embodiment of the present invention.

FIG. 5C illustrates an exemplary data structure with selected standby links in a redundant virtual link aggregation group in response to a failure, in accordance with an embodiment of the present invention.

FIG. 5D illustrates an exemplary data structure with selected active links in a redundant virtual link aggregation group in response to a failure recovery, in accordance with an embodiment of the present invention.

In the figures, like reference numerals refer to the same figure elements.

DETAILED DESCRIPTION

Figure 1A:
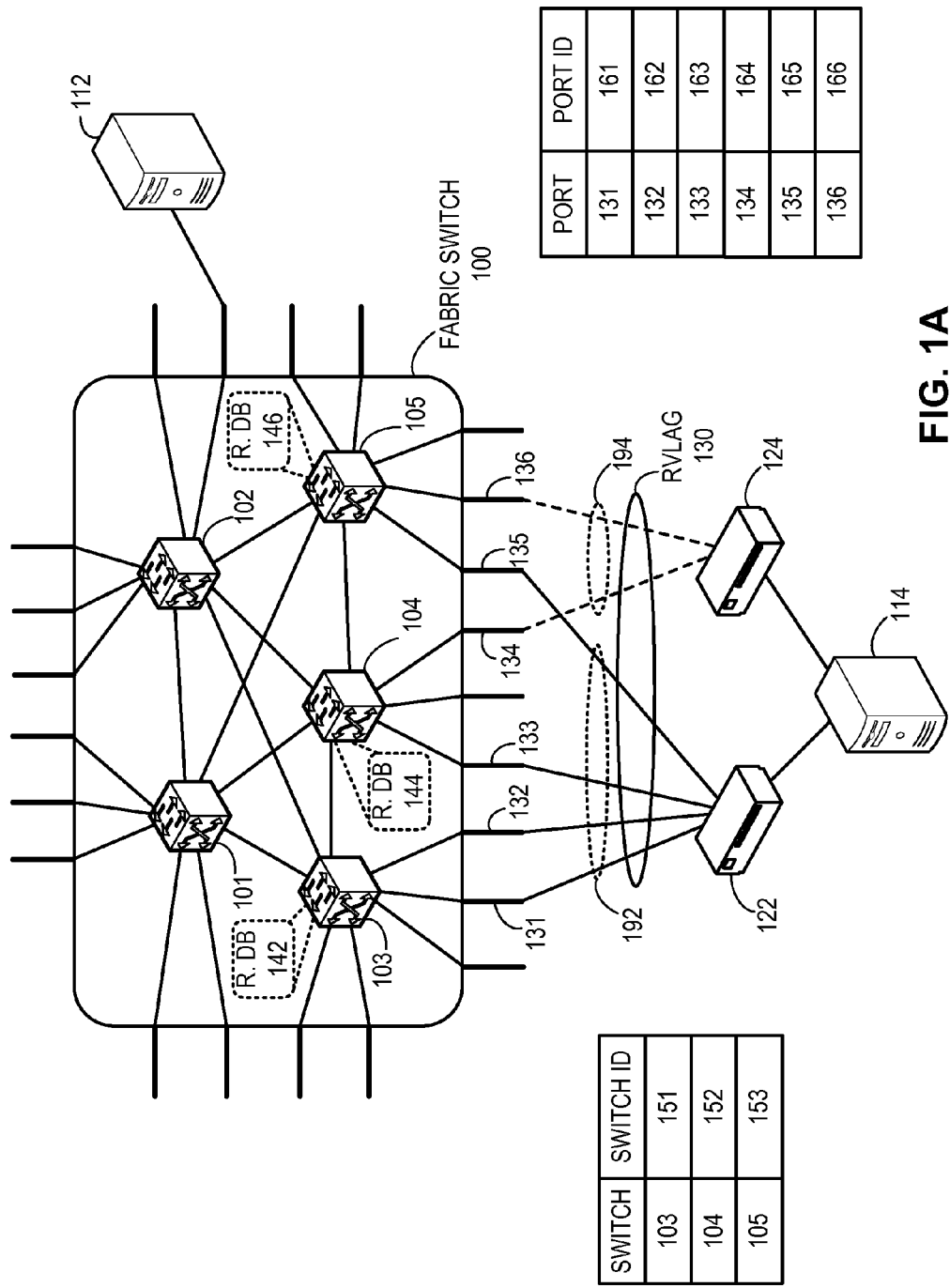
FIG. 1A illustrates an exemplary redundant virtual link aggregation group, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of facilitating device-level redundancy in a virtual link aggregation group (VLAG) is solved by dividing the links in the virtual link aggregation group into active and standby link sets for active and standby devices, respectively.

An end device (e.g., a host machine or a customer switch) can be coupled to a plurality of switches via a virtual link aggregation group. The plurality of switches participating in the virtual link aggregation group can be referred to as "participant switches" of the virtual link aggregation group. A port participating in the virtual link aggregation group can be referred to as a participant port. One or more of the participant switches can be a member switch of a fabric switch. With existing technologies, a respective participant switch operates a respective local participant port (and the link coupled to the port) as an active port for the virtual link aggregation group. This facilitates forwarding of different packets via different participant switches.

However, a user (e.g., a customer) can deploy active-standby redundancy among the end devices (e.g., customer switches) coupled via the virtual link aggregation group. As a result, the client may couple both active and standby end devices to the same virtual link aggregation group. If a link to the active end device fails, a participant switch may start forwarding data to a standby end device even when other links to the active end device remain operational. This can cause repeated network changes, which may lead to degraded performance. Furthermore, among the participant switches, one switch typically operates as the principal switch, which maintains the state of a respective participant switch and a participant port. During failover, a respective participant switch sends and receives control messages to and from this principal switch, respectively, to determine the current state of the virtual link aggregation group. Hence, this principal switch can become a single point of failure.

To solve this problem, a virtual link aggregation group includes a set of active links and a set of standby links. One set of links is allowed to carry traffic in the virtual link aggregation group at a time. The set of active links couples at least two participant switches to an active end device. Similarly, the set of standby links couples at least two participant switches to a standby end device. Such a link aggregation group can be referred to as a redundant link aggregation group (RVLAG). It should be noted that a redundant link aggregation group can couple more than one standby end devices. Under such circumstances, the set of standby links can include one or more subsets of standby links, and each subset of standby links couples a standby end device.

A respective participant switch of the redundant virtual link aggregation group maintains a data structure, which can be referred to as a redundant virtual link aggregation group database (RVLAG database). A respective entry of the database is associated with a link in the redundant virtual link aggregation group and indicates to which set the link belongs. The set of active links carries traffic for the redundant virtual link aggregation group as long as a minimum number of links in that set remain operational. During regular operation, a respective participant switch individually selects the set of active links to carry traffic (e.g., send or receive traffic) for the redundant virtual link aggregation group. If a minimum number of links in the set of active links is not operational, a respective participant switch individually makes a distributed decision to select the set (or a subset) of standby links to carry traffic based on the entries of the database. As a result, disruption to the network is reduced by providing high availability to the links of a link set, thereby reducing data loss during a failover. In this way, a redundant virtual link aggregation group provides device-level redundancy in the network.

In some embodiments, a participant switch can be in a fabric switch. A respective switch in a fabric switch can be referred to as a member switch. In a fabric switch, any number of switches coupled in an arbitrary topology may logically operate as a single switch. The fabric switch can be an Ethernet fabric switch or a virtual cluster switch (VCS), which can operate as a single Ethernet switch. Any member switch may join or leave the fabric switch in "plug-and-play" mode without any manual configuration. In some embodiments, a respective switch in the fabric switch is a Transparent Interconnection of Lots of Links (TRILL) routing bridge (RBridge). In some further embodiments, a respective switch in the fabric switch is an Internet Protocol (IP) routing-capable switch (e.g., an IP router).

In some embodiments, a respective member switch of the fabric switch can be equipped with a persistent storage framework, which stores the configuration information in a local persistent storage. Such a persistent storage can be an object relational database. The configuration information is loaded from this persistent storage to the switch (or device) modules (e.g., the application-specific integrated circuit (ASIC) chips of the switch). In some embodiments, an Object-Relational Mapping is used to store the attribute values of a switch unit in a structured way in an object relational database. When a unit becomes operational on the switch, attribute values associated with a respective class in that unit is automatically loaded from the database. Moreover, if a class changes (e.g., a new attribute or a new relationship), that change is seamlessly incorporated into the database.

It should be noted that a fabric switch is not the same as conventional switch stacking. In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

In contrast, a fabric switch can include an arbitrary number of switches with individual addresses, can be based on an arbitrary topology, and does not require extensive manual configuration. The switches can reside in the same location, or be distributed over different locations. These features overcome the inherent limitations of switch stacking and make it possible to build a large "switch farm," which can be treated as a single, logical switch. Due to the automatic configuration capabilities of the fabric switch, an individual physical switch can dynamically join or leave the fabric switch without disrupting services to the rest of the network.

Furthermore, the automatic and dynamic configurability of the fabric switch allows a network operator to build its switching system in a distributed and "pay-as-you-grow" fashion without sacrificing scalability. The fabric switch's ability to respond to changing network conditions makes it an ideal solution in a virtual computing environment, where network loads often change with time.

In switch stacking, multiple switches are interconnected at a common location (often within the same rack), based on a particular topology, and manually configured in a particular way. These stacked switches typically share a common address, e.g., an IP address, so they can be addressed as a single switch externally. Furthermore, switch stacking requires a significant amount of manual configuration of the ports and inter-switch links. The need for manual configuration prohibits switch stacking from being a viable option in building a large-scale switching system. The topology restriction imposed by switch stacking also limits the number of switches that can be stacked. This is because it is very difficult, if not impossible, to design a stack topology that allows the overall switch bandwidth to scale adequately with the number of switch units.

It should also be noted that a fabric switch is distinct from a virtual local area network (VLAN). A fabric switch can accommodate a plurality of VLANs. A VLAN is typically identified by a VLAN tag. In contrast, the fabric switch is identified a fabric identifier (e.g., a VCS identifier), which is assigned to the fabric switch. A respective member switch of the fabric switch is associated with the fabric identifier. Furthermore, when a member switch of a fabric switch learns a media access control (MAC) address of an end device (e.g., via layer-2 MAC address learning), the member switch generates a notification message, includes the learned MAC address in the payload of the notification message, and sends the notification message to all other member switches of the fabric switch. In this way, a learned MAC address is shared among a respective member switch of the fabric switch.

The term "fabric switch" refers to a number of interconnected physical switches which form a single, scalable switch. These physical switches are referred to as member switches of the fabric switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally. Although the present disclosure is presented using examples based on a fabric switch, embodiments of the present invention are not limited to a fabric switch. Embodiments of the present invention are relevant to any computing device that includes a plurality of devices operating as a single device.

The term "end device" can refer to any device external to a fabric switch. Examples of an end device include, but are not limited to, a host machine, a conventional layer-2 switch, a layer-3 router, or any other type of network device. Additionally, an end device can be coupled to other switches or hosts further away from a layer-2 or layer-3 network. An end device can also be an aggregation point for a number of network devices to enter the fabric switch. An end device hosting one or more virtual machines can be referred to as a host machine. In this disclosure, the terms "end device" and "host machine" are used interchangeably.

The term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine/switch operating on a computing device) that can forward traffic to an end device can be referred to as a "switch." Examples of a "switch" include, but are not limited to, a layer-2 switch, a layer-3 router, a TRILL RBridge, or a fabric switch comprising a plurality of similar or heterogeneous smaller physical and/or virtual switches.

The term "edge port" refers to a port on a fabric switch which exchanges data frames with a network device outside of the fabric switch (i.e., an edge port is not used for exchanging data frames with another member switch of a fabric switch). The term "inter-switch port" refers to a port which sends/receives data frames among member switches of a fabric switch. The terms "interface" and "port" are used interchangeably.

The term "switch identifier" refers to a group of bits that can be used to identify a switch. Examples of a switch identifier include, but are not limited to, a media access control (MAC) address, an Internet Protocol (IP) address, and an RBridge identifier. Note that the TRILL standard uses "RBridge ID" (RBridge identifier) to denote a 48-bit intermediate-system-to-intermediate-system (IS-IS) System ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is also used in a generic sense, is not limited to any bit format, and can refer to "RBridge ID," "RBridge nickname," or any other format that can identify an RBridge.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," or "datagram."

The term "dual-homed end device" refers to an end device that has an aggregate link to two or more switches belonging to one or more fabric switches, where the aggregate link includes multiple physical links to the different switches. The aggregate link, which includes multiple physical links, functions as one logical link to the end station. Although the term "dual" is used here, the term "dual-homed end device" does not limit the number of physical switches sharing the aggregate link to two. In various embodiments, other numbers of physical switches can share the same aggregate link. Where "dual-homed end device" is used in the present disclosure, the term "multi-homed end device" can also be used.

Network Architecture

FIG. 1A illustrates an exemplary redundant virtual link aggregation group, in accordance with an embodiment of the present invention. As illustrated in FIG. 1A, a fabric switch 100 includes switches 101, 102, 103, 104, and 105. A switch in a fabric switch can be referred to as a member switch. A member switch, such as switch 102, of fabric switch 100 can be configured by logging in to switch 102 (e.g., via telnet) or via a console port (e.g., an RS-232 port). Such configuration can be related to network virtualizations, partitions, and switch groups, and a plurality of network protocols of different network layers. The attribute values (e.g., parameters) of the configuration information can be stored in a local persistent storage and applied to switch 102 (e.g., loaded to the switch modules). Configuration and state information of fabric switch 100 can be stored in a persistent storage of a respective member switch of fabric switch group 100.

An end device coupled to fabric switch 100 can be a host machine (e.g., a server or a computing device hosting virtual machines) or a customer networking device (e.g., a layer-2 switch or a layer-3 routing device). In this example, an end device 112, which is a host machine, is coupled to switch 102. End device 112 can host one or more virtual machines. End device 112 can include a hypervisor, which runs one or more virtual machines. End device 112 can be equipped with a Network Interface Card (NIC) with one or more ports. End device 112 couples to switch 102 via the ports of the NIC. On the other hand, end devices 122 and 124, which are coupled to fabric switch 100, are customer network devices. End devices 122 and 124 can be coupled to end device 114, which can be a host machine. Since end devices 122 and 124 are customer network devices, they can forward traffic received from fabric switch 100 to end device 114. In this disclosure, the terms "end device" and "customer network device" are used interchangeably.

In some embodiments, data communication among the member switches of fabric switch 100 is based on the TRILL protocol and a respective switch of fabric switch 100, such as switch 102, is a TRILL RBridge. Upon receiving an Ethernet frame from end device 112, switch 102 encapsulates the received Ethernet frame in a TRILL header and forwards the TRILL packet. In some embodiments, data communication among the member switches of fabric switch 100 is based on IP and a respective switch of fabric switch 100, such as switch 102, is an IP-capable switch. An IP-capable switch populates and maintains a local IP routing table, such as a routing information base, or RIB, by participating in a routing algorithm, and is capable of forwarding packets based on its IP addresses. For example, upon receiving an Ethernet frame from end device 112, switch 102 encapsulates the received Ethernet frame in an IP header and forwards the IP packet.

Switches 103, 104, and 105 are configured to operate in a special "trunked" mode for dual-homed end devices 122 and 124 and form a virtual link aggregation group 130. Switches 103, 104, and 105 can be referred to as "participant switches" of virtual link aggregation group 130. Switch identifiers 151, 152, and 153 are associated with switches 103, 104, and 105, respectively. Switch identifiers 151, 152, and 153 uniquely identify switches 103, 104, and 105, respectively, in fabric switch 100. In some embodiments, the scope of switch identifiers 151, 152, and 153 is within fabric switch 100. Ports 131 and 132 of switch 103 participate in virtual link aggregation group 130 and can be referred to as participant ports. Similarly, ports 133 and 134 of switch 104 and ports 135 and 136 of switch 105 are participant ports of virtual link aggregation group 130 as well. Port identifiers 161, 162, 163, 164, 165, and 166 are associated with participant ports 131, 132, 133, 134, 135, and 136, respectively.

With existing technologies, participant switch 105 operates ports 135 and 136 as active ports for virtual link aggregation group 130. Similarly, switches 103 and 104 operate their respective local participant ports as active ports as well. This facilitates forwarding of different packets via different participant switches. However, a user (e.g., a customer) can deploy active-standby redundancy among end devices 122 and 124 coupled via virtual link aggregation group 130. Suppose that end device 122 is the active device and end device 124 is the standby device. If a link to end device 122 (e.g., the link coupled to port 135) fails, switch 105 may start forwarding data to end device 124 even when other links to end device 122 (e.g., links coupled to ports 131-133) remain operational. This can cause repeated network changes, which may lead to degraded performance.

Furthermore, among participant switches 103, 104, and 105, one switch typically operates as the principal switch and maintains the state of a respective participant switch and a respective participant port. During a failover, a respective participant switch sends and receives control messages to and from this principal switch, respectively, to determine the current state of virtual link aggregation group 130. This principal switch can become a single point of failure and create a bottleneck.

To solve this problem, virtual link aggregation group 130 includes a set 192 of active links and a set 194 of standby links. One of these sets of links is allowed to carry traffic in virtual link aggregation group 130 at a time. Set 192 couple participant switches 103, 104, and 105 to end device 122. Similarly, set 194 couple participant switches 104 and 105 to end device 124. Such a link aggregation group can be referred to as a redundant link aggregation group. It should be noted that redundant link aggregation group 130 can couple more than one standby end devices. Under such circumstances, set 194 can include one or more subsets of standby links, and each subset of standby links couple a standby end device. In some embodiments, virtual link aggregation group 130 is associated with a group identifier, which is the same in a respective participant switch. A respective participant switch identifies virtual link aggregation group 130 by that group identifier and can maintain a mapping between the local participant ports and the group identifier.

Switches 103, 104, and 105 maintain a data structure 142, 144, and 146, respectively, to store information associated with redundant virtual link aggregation group 130. This data structure can be referred to as a redundant virtual link aggregation group database (RVLAG database). For example, a respective entry of database 142 corresponds to a port coupled to a link in redundant virtual link aggregation group 130 and is represented by the port identifier of the port. The entry can also include the switch identifier of the switch which includes the port. This entry further indicates whether the link belongs to set 192 or set 194. For example, the entry for the link between switch 104 and end device 122 can include port identifier 165 and switch identifier 153, and indicates that the link belong to set 192.

During initialization, switch 103, 104, and 105 individually select set 192 to carry traffic for redundant virtual link aggregation group 130. Links in set 192 carry traffic as long as a minimum number of links in set 192 remain operational. For example, if the minimum number is two, links in set 192 carry traffic as long as at least two links in set 192 remain operational. When one of the participant switches, such as switch 105, receives a packet for end device 114, switch 105 determines that the packet should be forwarded via redundant virtual link aggregation group 130. Switch 105 forwards the packet via port 135 coupled to an active link. If the link becomes unavailable (e.g., due a failure), switch 105 does not have a local participant port coupled to an active link. Switch 105 then forwards the packet to another participant switch, such as switch 104, coupled to an operational active link. This allows switch 105 to forward the packet to end device 122 even when the link coupled to port 135 fails. As a result, disruption to the network is reduced by providing high availability to the links of set 192 (and set 194), thereby reducing data loss during a failover.

If the number of operational links in set 192 falls below two, switches 103, 104, and 105 individually select the links in set 194 to forward traffic based on the entries of in databases 142, 144, and 146, respectively. For example, switch 103 checks the entries of database 142 to determine that the number of operational links in set 192 has fallen below two and selects set 194 to forward traffic. Since the ports coupled to the links in set 194 are mapped to the same group identifier of redundant virtual link aggregation group 130, a respective participant switch can readily select the ports coupled to the links in set 194 for forwarding traffic. It should be noted that even though switch 103 can be coupled to an operational link of set 192 and not coupled to a link in set 194, switch 103 selects set 194 to forward traffic. Switches 104 and 105 individually select set 194 to forward traffic as well. In some embodiments, selection of set 194 is atomic among the participant switches of virtual link aggregation group 130. This atomic operation ensures that the operation is executed at a participant switch when all participant switches "agree" with (e.g., can also execute) the operation.

When switch 105 receives another packet which should be forwarded via redundant virtual link aggregation group 130, switch 105 forwards the packet via port 136, which is coupled to a link in set 194. When the links of set 192 recover from the failure and at least two links in set 192 become operational, switches 103, 104, and 105 can continue to use the links in set 194 to carry traffic. In this way, redundant virtual link aggregation group 130 can reduce the number of changes in the network. However, if the number of operational links in set 194 falls below two, switches 103, 104, and 105 individually select set 192 to forward traffic. In this way, redundant virtual link aggregation group 130 facilitates device-level high availability, which is switch-level high availability in this example, to end devices 122 and 124.

Figure 1B:
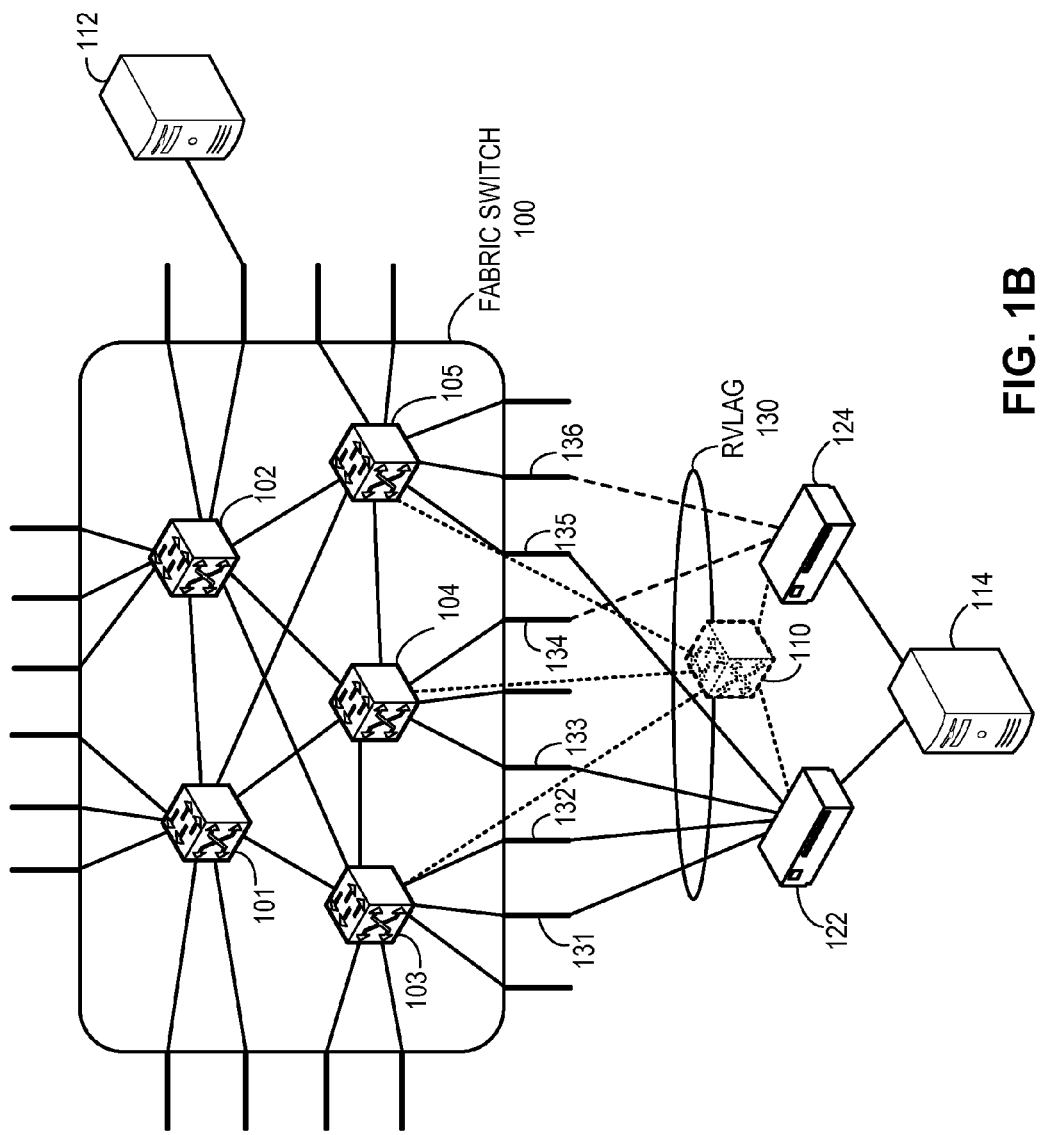
FIG. 1B illustrates an exemplary redundant virtual link aggregation group with a virtual switch, in accordance with an embodiment of the present invention.

FIG. 1B illustrates an exemplary redundant virtual link aggregation group with a virtual switch, in accordance with an embodiment of the present invention. In this example, redundant virtual link aggregation group 130 is represented as a virtual switch 110. It should be noted that virtual switch 110 is distinct from a virtual customer network device, which can be associated with end devices 122 and 124. End devices 122 and 124 view participant switches 103, 104, and 105 as a common virtual switch 110, with a corresponding virtual switch identifier. Dual-homed end devices 122 and 124 are considered to be logically coupled to virtual switch 110 via logical links represented by dotted lines. Virtual switch 110 is considered to be logically coupled to participant switches 103, 104, and 105, optionally with zero-cost links (also represented by dotted lines). Furthermore, switches 103, 104, and 105 can advertise their respective connectivity to virtual switch 110. Hence, multi-pathing can be achieved when switches 101 and 102 choose to send packets to virtual switch 110 (which are marked as the egress switch in the packets) via switches 103, 104, and 105.

During operation, switch 102 learns the MAC address of end device 112 and distributes the learned MAC address in a payload of a notification message to a respective switch of fabric switch 100. Based on the notification, a respective switch of fabric switch maintains a mapping between the MAC address of end device 112 and the switch identifier of switch 102. When end device 114 sends a packet to end device 112 via active end device 122, one of the participant switches, such as switch 104, receives the packet. Switch 104 determines from its local mapping that end device 112 is reachable via switch 102. Switch 104 encapsulates the packet in a fabric encapsulation header (e.g., a TRILL or an IP header) and assigns the virtual switch identifier of virtual switch 110 as the ingress switch identifier of the encapsulation header. Switch 104 then forwards the packet to switch 102 via an inter-switch link. Upon receiving the packet, switch 102 learns that end device 114 is reachable via virtual switch 110.

Since participant switches 103, 104, and 105 function as a single virtual switch 110, the MAC address reachability learned by a participant switch is shared with the other participant switches of redundant virtual link aggregation group 130. For example, during normal operation, end device 122 may choose to send outgoing packets from end device 114 only via the links to switch 104. As a result, only switch 104 learns the MAC address of end device 114 and associates the MAC address with the virtual switch identifier of virtual switch 110. This information is then shared by switch 104 with switches 103 and 105. When end device 112 sends a packet to end device 114, switch 102 encapsulates the packet in an encapsulation header and assigns the virtual switch identifier of virtual switch 110 as the egress switch identifier of the encapsulation header.

Since virtual switch 110 is "reachable" via any of switches 103, 104, and 105, switch 102 can forward the packet to switch 103, 104, or 105. If switch 103 receives the packet, switch 103 determines that the egress switch identifier of the encapsulation header is associated with the local switch and decapsulates the fabric encapsulation header. Switch 103 extracts the inner packet, which can be an Ethernet frame with the MAC address of end device 114 as the destination MAC address. Switch 103 determines that the MAC address of end device 114 is associated with the virtual switch identifier of virtual switch 110, which is associated with redundant virtual link aggregation group 130. Switch 103 then forwards the packet via one of its participant ports 131 and 132. In some embodiments, switch 103 deploys a selection technique (e.g., round robin or weighted selection) to select one of the participant ports 131 and 132 for forwarding the packet.

Database and State Machine

Figure 2A:
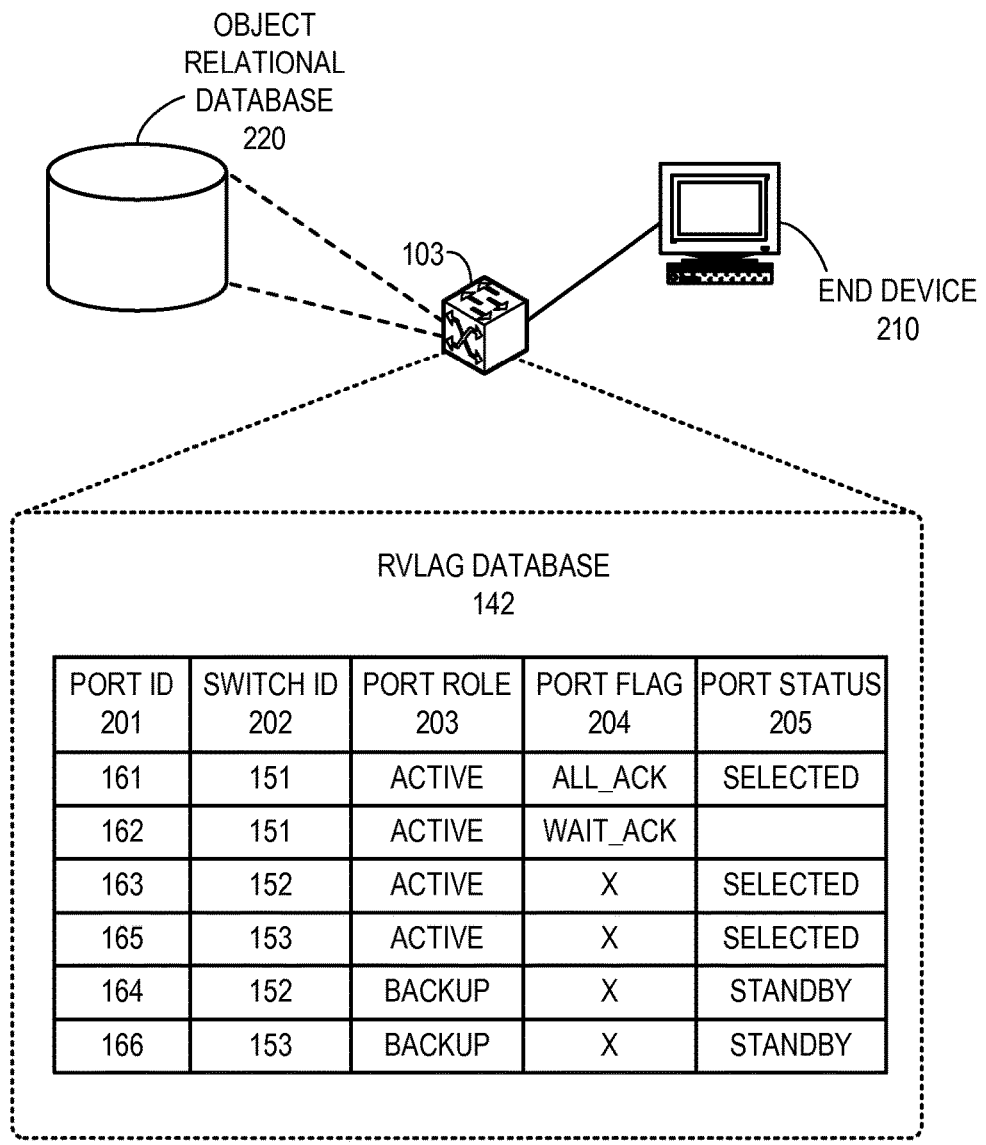
FIG. 2A illustrates an exemplary data structure in a switch for a redundant virtual link aggregation group, in accordance with an embodiment of the present invention.

In the example in FIG. 1A, participant switches 103, 104, and 105 maintain local databases 142, 144, and 146, respectively, comprising information of a respective participant port of redundant virtual link aggregation group 130. FIG. 2A illustrates an exemplary data structure in a switch for a redundant virtual link aggregation group, in accordance with an embodiment of the present invention. The data structure in switch 103 is redundant virtual link aggregation group database 142. Switch 103 can be coupled to an end device 116. A user (e.g., a network administrator) can provide configuration information associated with redundant virtual link aggregation group 130 from end device 116 by logging in to switch 103 (e.g., via telnet) or via a console port of switch 103 (e.g., an RS-232 port). In some embodiments, switch 103 includes an object relational database 220, which stores global configuration information associated with fabric switch 100 and local configuration information associated with switch 103. Database 142 can be stored as a table in object relational database 220.

A respective entry of database 142 corresponds to a link in redundant virtual link aggregation group 130. The entry can include one or more fields, such as a port identifier 201, a switch identifier 202, a port role 203, a port flag 204, and a port status 205. A respective field can be represented as a column of database 142. Port identifier 201 identifies a port which couples the link and can be used as the index for database 142. Switch identifier 202 identifies the switch in which the port resides. Port role 203 indicates whether a port belongs to set 192 or set 194 (e.g., active or backup) and can be preconfigured. Port flag 204 indicates whether information associated with a local participant port has been updated at other participant switches. Port status 205 indicates which set is currently selected to carry traffic for redundant virtual link aggregation group 130.

During operation, switch 103, which has switch identifier 151, discovers that its local port 131, which has port identifier 161, is a participant port of redundant virtual link aggregation group 130. Switch 103 adds the information in an entry comprising port identifier 161 in database 142. Switch 103 then sends a notification message comprising the port information to switches 104 and 105. Similarly, upon discovering that port 132, which has port identifier 162, is a participant port of redundant virtual link aggregation group 130, switch 103 adds the information in an entry comprising port identifier 162 in database 142. Switch 103 sends another notification message comprising the port information to switches 104 and 105. While waiting for an acknowledgement from switches 104 and 105, switch 103 sets the corresponding port flag to WAIT_ACK, which indicates that a notification for that port has been sent but an acknowledgement from a respective other participant switch has not been received yet.

In this example, upon receiving a respective acknowledgement for the notification for port identifier 161, switch 103 sets the corresponding port flag to ALL_ACK, which indicates that an acknowledgement from a respective other participant switch has been received. Upon setting the port flag, switch 103 determines the port status for port identifier 161 (i.e., port 131) based on its port role. Since port role associated with port identifier 161 is "active," switch 103 sets the port status to be "selected," which indicates that the port should carry traffic for redundant virtual link aggregation group 130. On the other hand, if the port flag remains in WAIT_ACK, switch 103 does not set a port status for port identifier 162 (i.e., for port 132). If switch 103 receives a respective acknowledgement for the notification for port identifier 162, switch 103 sets the corresponding port flag to ALL_ACK.

When switch 103 receives a notification message from switch 104, which has switch identifier 152, switch 103 discovers that port 133, which has port identifier 163, is a participant port of redundant virtual link aggregation group 130. Switch 103 adds the information in an entry comprising port identifier 161 in database 142. Since port 133 is in a remote participant switch 104, port 133 is a remote participant port for switch 103. Switch 103 sets the port flag to X, which indicates that a value of the port flag is not relevant to an entry for a remote participant port. Switch 103 then sends an acknowledgement message in response to the notification message to switch 104. Switch 103 then determines the port status for port identifier 163 (i.e., port 133) based on its port role. Since port role associated with port identifier 163 is "active," switch 103 sets the port status to be "selected."

Similarly, upon receiving a notification from switch 104, switch 103 adds the information associated with port 134, which has port identifier 164, in an entry comprising port identifier 164 in database 142. Switch 103 sets the port flag to X, sends an acknowledgement message to switch 104, and determines the port status for port identifier 164 (i.e., port 134). Since port role associated with port identifier 164 is "backup," switch 103 sets the port status to be "standby." In the same way, upon receiving respective notifications from switch 105, switch 103 adds the information associated with ports 135 and 136, which have port identifiers 165 and 166, respectively, in corresponding entries in database 142. Switch 103 sets the corresponding port flags to X, sends acknowledgement messages to switch 105 for respective notification messages, and determines the port status for port identifiers 165 and 166 (i.e., ports 135 and 136, respectively). Since port role associated with port identifiers 165 and 166 are "active" and "backup," respectively, switch 103 sets the port status to be "selected" and "standby," respectively.

Figure 2B:
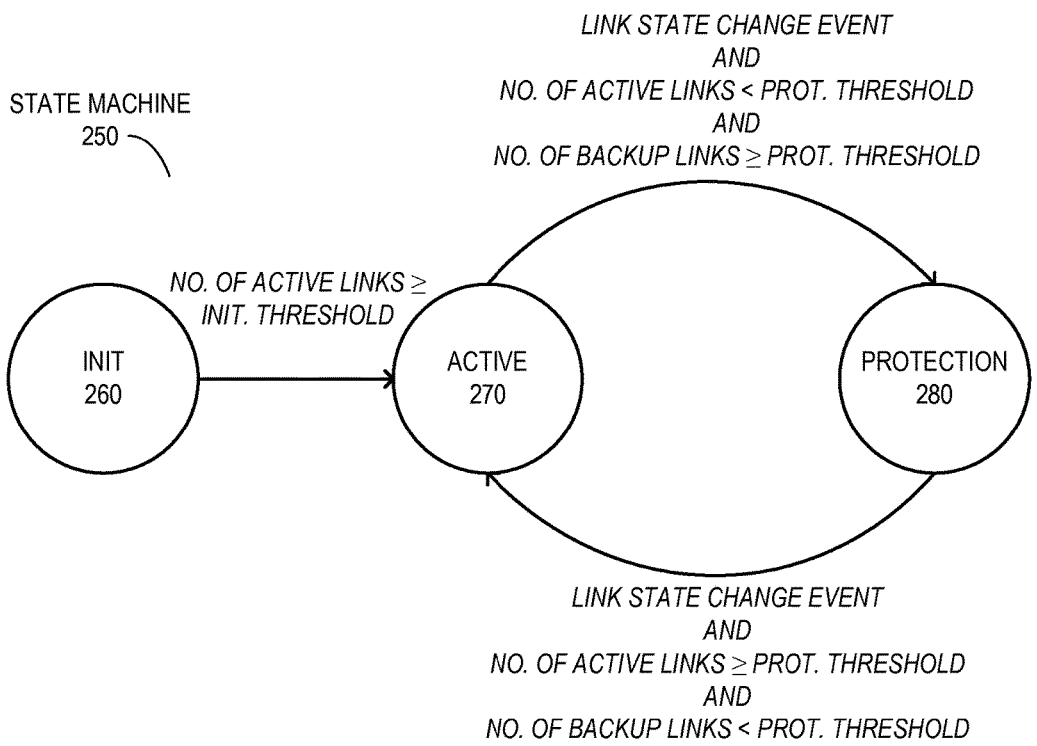
FIG. 2B illustrates an exemplary state machine for a redundant virtual link aggregation group, in accordance with an embodiment of the present invention.

In the example in FIG. 2A, when a minimum number of active links are selected (i.e., a minimum number of entries have a "selected" port status in database 142), switch 103 can initiate a state machine for redundant virtual link aggregation group 130. Similarly, switch 104 and 105 can individually initiate the state machine in a distributed way. FIG. 2B illustrates an exemplary state machine for a redundant virtual link aggregation group, in accordance with an embodiment of the present invention. Participant switches 103, 104, and 105 individually maintain a state machine 250 for redundant virtual link aggregation group 130. When a participant switch, such as switch 103, discovers that the local switch is in a redundant virtual link aggregation group 130, switch 103 initiates state machine 250 by starting in an init mode 260.

When switch 103 selects a minimum number of active links (i.e., marks a minimum number of entries as "selected" in database 142), switch 103 transitions from init mode 260 to an active mode 270. The minimum number of active links needed to transition from init mode 260 to active mode 270 is referred to as an initialization threshold. In some embodiments, the initialization threshold is one. In the same way, when switches 104 and 105 select a minimum number of active links from databases 144 and 146, respectively, switches 104 and 105 individually transition from init mode 260 to active mode 270. When a participant switch is in active mode 270, the active links (i.e., the links coupled to ports with an "active" port role in database 142) are selected to operate and carry traffic for redundant virtual link aggregation group 130. In the example in FIG. 1A, active links are in set 192. As long as a minimum number of links coupled to the ports with an "active" port role remain operational, a participant switch remains in active mode 270. The minimum number of links needed to remain in active mode 270 is referred to as a protection threshold.

If a link becomes unavailable (e.g., due to a failure), a "link down" link state change event occurs for that link. On the other hand, if an unavailable link becomes available (e.g., due to a failure recovery), a "link up" link state change event occurs for that link. A link state change event can be detected locally or received from a remote participant switch. When a participant switch, such as switch 103, detects a link state change event, switch 103 checks the number of active links and backup links (i.e., the number of links coupled to ports with a "backup" port role in database 142). If the number of active links falls below the protection threshold (e.g., due to a link down event) and the number of backup links is greater than or equal to the protection threshold, switch 103 transitions from active mode 270 to a protection mode 280. In the same way, switches 104 and 105 individually detect a link state change event, make the determinations, and transition from active mode 270 to protection mode 280.

In some embodiments, transitioning from active mode 270 to the protection mode 280 in a respective participant switch is atomic among the participant switches of redundant virtual link aggregation group 130. This atomic operation ensures that the operation is only executed at a participant switch when all participant switches "agree" with (e.g., can also execute) the operation. For example, when switch 103 determines to transition from active mode 270 to protection mode 280, switch 103 obtains a lock (e.g., a fabric-wide lock in fabric switch 100) for state machine 250. As a result, switches 104 and 105 do not transition between modes in state machine 250 as long as the lock is active. Switch 103 sends a control message to switches 104 and 105 indicating that switch 103 is ready for the transition.

Upon receiving the control message, switch 104 and 105 check whether this transition operation is allowed based on databases 144 and 146, respectively. If allowed, switches 104 and 105 send respective agreement messages back to switch 103. Upon receiving the agreement messages, switch 103 transitions from active mode 270 to protection mode 280 and releases the lock. If either switch 104 and 105 determines that the transition operation is not allowed, that switch sends a disagreement message to switch 103. If switch 103 receives a disagreement message, switch 103 cancels the transition operation and releases the lock. In this way, participant switches avoid a race condition during a transition in state machine 250.

When a participant switch, such as switch 103, is in the protection mode 280, the backup links are selected to operate and carry traffic for redundant virtual link aggregation group 130. In database 142, switch 103 sets the port status as "selected" to the entries with a "backup" port role. In the example in FIG. 1A, the backup links are in set 194. If switch 103 detects another link state change event, and determines that the number of active links has become greater than or equal to the protection threshold (e.g., due to a link up event) but the number of backup links remains greater than or equal to the protection threshold, switch 103 continues to use the backup links to carry traffic. This reduces changes in the network. However, if switch 103 determines that the number of active links is greater than or equal to the protection threshold and the number of backup links has fallen below the protection threshold, switch 103 transitions back from protection mode 280 to active mode 270. In the same way, switches 104 and 105 individually detect a link state change event, make the determinations, and transition back from active mode 270 to protection mode 280.

Initialization

Figure 3:
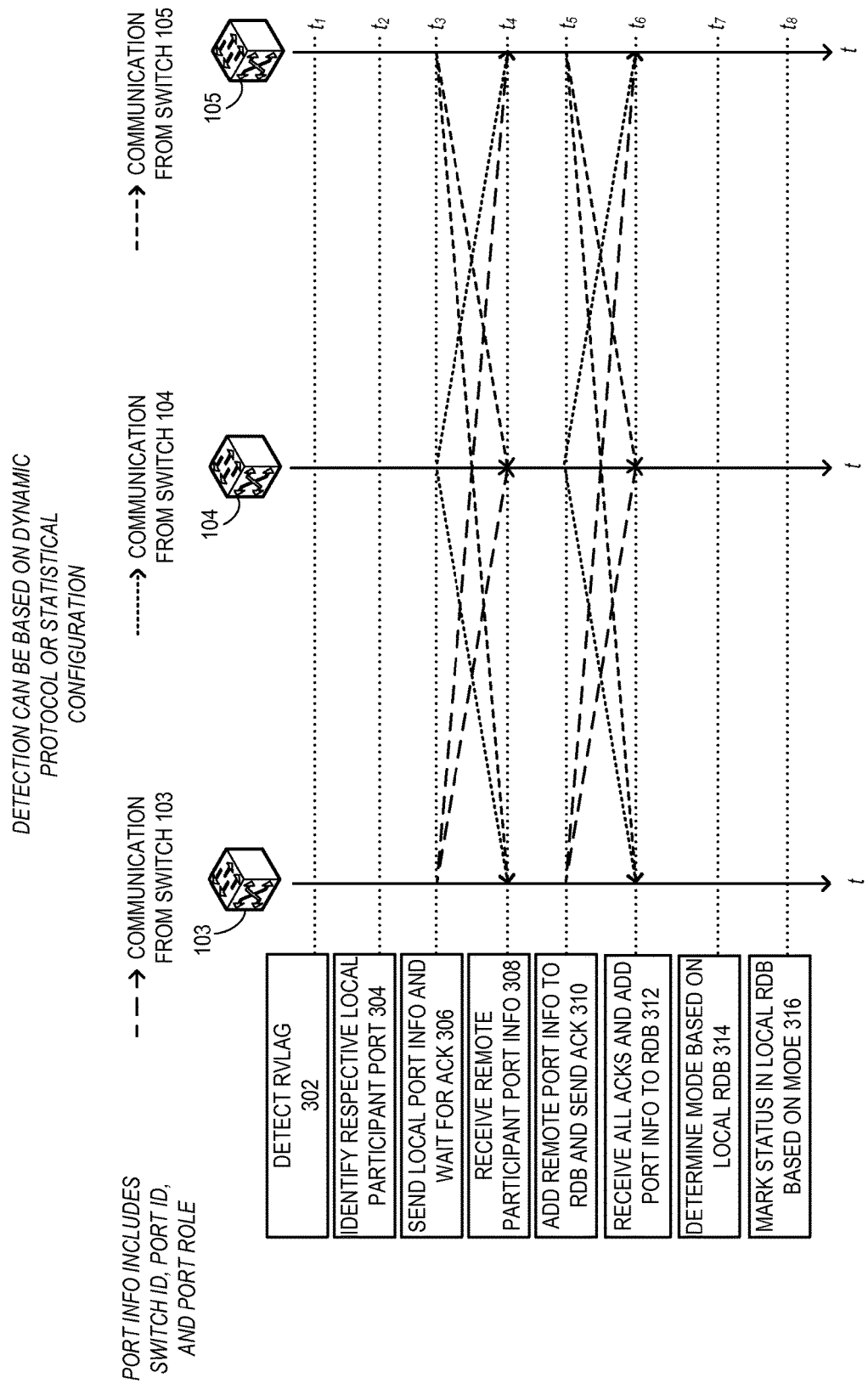
FIG. 3 illustrates an exemplary distributed initialization of a redundant virtual link aggregation group, in accordance with an embodiment of the present invention.

FIG. 3 illustrates an exemplary distributed initialization of a redundant virtual link aggregation group, in accordance with an embodiment of the present invention. In this example, participant switches 103, 104, and 105 initializes redundant virtual link aggregation group 130. During operation, a respective participant switch (e.g., switch 103) detects redundant virtual link aggregation group 130 (operation 302). This detection can be based on a link aggregation detection protocol (e.g., Link Aggregation Control Protocol (LACP)) or from preconfigured information (e.g., configuration information provided by a user). The switch then identifies a respective local port participating in redundant virtual link aggregation group 130 (operation 304). The switch sends the local port information associated with a respective identified port to other participant switches and waits for an acknowledgement (operation 306). The port information includes one or more of: a port identifier, which can uniquely identify a port in a fabric switch, a switch identifier which identifies the switch in which the port resides, and a port role associated with the port.

Remote participant switches individually send their respective port information associated their local ports in redundant virtual link aggregation group 130 to the local participant switch as well. From the local switch's perspective, these ports are remote participant ports and their associated port information is remote participant port information. In the example in FIG. 1A, if the local switch is switch 103, switches 104 and 105 are the remote participant switches, and ports 131 and 132 are the local participant ports, and ports 133, 134, 135, and 136 are the remote participant ports. The local participant switch receives remote participant port information (e.g., via a notification message) from other participant switches (operation 308). The switch then adds the received remote participant port information to its local redundant virtual link aggregation group database and sends an acknowledgement for the received information to the other participant switches (operation 310).

The switch receives respective acknowledgements from other participant switches for its local port information and adds the local port information to its local database (operation 312). The switch then determines the mode for the redundant virtual link aggregation group based on the local database (operation 314). For example, the switch can determine the mode to be active based on whether the number of ports with an "active" port role is greater than or equal to an initialization threshold. Based on the determined mode, the switch marks the port status of a respective entry in the local database (operation 316). For example, if the mode is active, the switch marks the entries with an "active" port role as "selected" and with a "backup" port role as "standby."

Figure 4A:
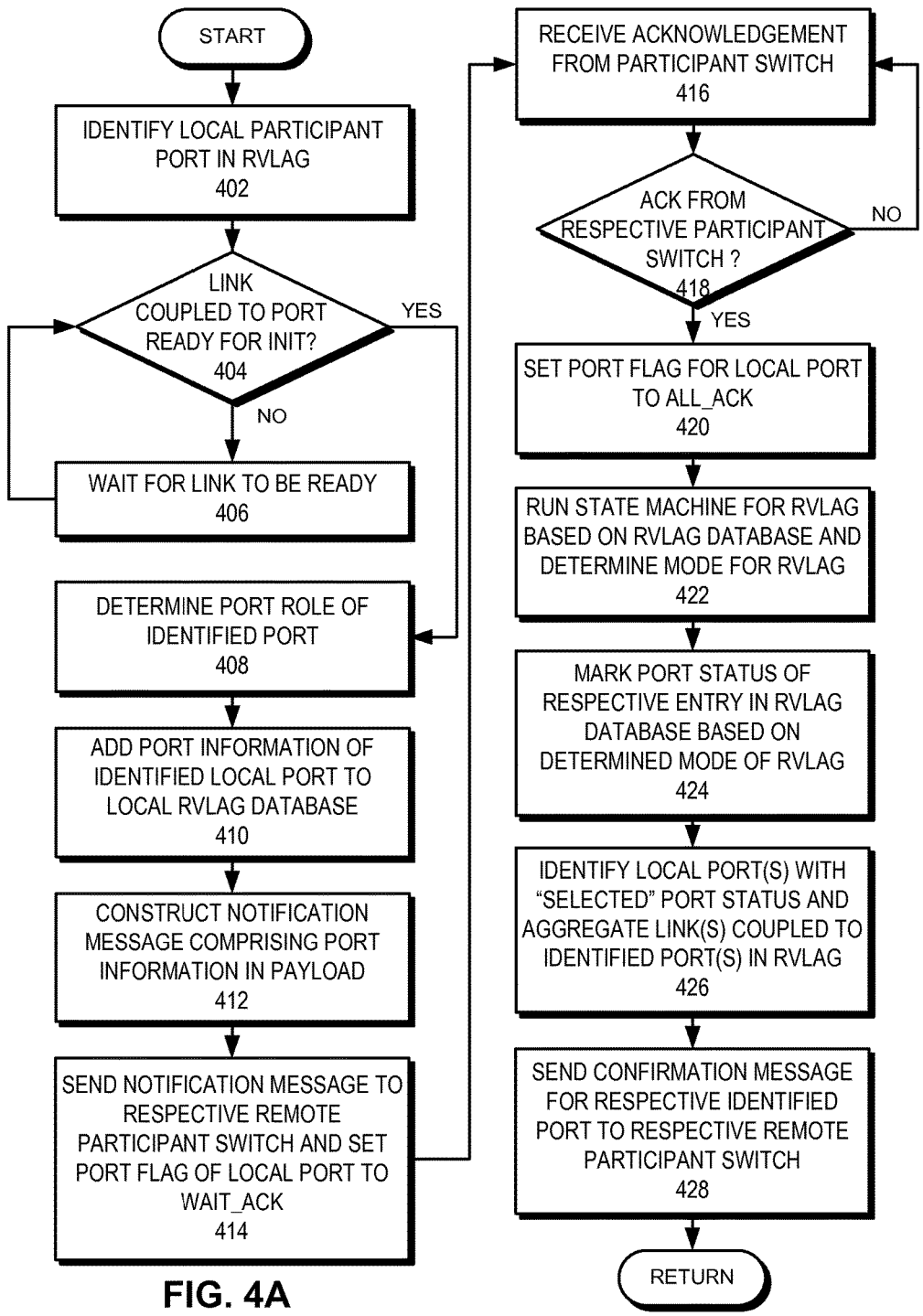
FIG. 4A presents a flowchart illustrating the process of a switch selecting an initial local port status for a redundant virtual link aggregation group, in accordance with an embodiment of the present invention.

FIG. 4A presents a flowchart illustrating the process of a switch selecting an initial local port status for a redundant virtual link aggregation group, in accordance with an embodiment of the present invention. During operation, the switch identifies a local participant port in a redundant virtual link aggregation group (operation 402). The switch then checks whether the link coupled to the port is ready for initialization (operation 404). If the link is statically configured, the link is ready for initialization if the link is operational (e.g., can send and receive a ping via the link). If the link is dynamically configured (e.g., using LACP), the link is ready for initialization if the switch has received partner port information (i.e., the port coupled to the other side of the link). The link can also be ready for initialization if the link is in a defaulted mode, wherein the link can be ready without receiving partner port information.

If the link is not ready, the switch waits for the link to be ready (e.g., wait for partner port information) (operation 406) and continues to check whether the link is ready (operation 404). If the link is ready, the switch determines the port role of the identified port (operation 408). In some embodiments, a port role is predetermined. The port role can be predetermined based on a pre-configuration from a user. The port role can be also be determined based on a policy-based pre-computation, such as a predetermined number of ports with a superior (i.e., the highest or lowest) port identifier values are assigned one port role (e.g., "active") and the rest of the ports are assigned another port role (e.g., "backup.") The switch then adds the port information of the identified local port to the local redundant virtual link aggregation group database (operation 410). Adding port information to the local database includes creating an entry in the database and inserting values associated with different fields of the entry, as described in conjunction with FIG. 2A.

The switch constructs a notification message comprising the port information in its payload (operation 412). This notification message can be a fabric control message of a fabric switch. This fabric control message can be a reliable message with ensured delivery (e.g., retransmitted if the message is lost). The switch then sends the notification message to a respective other participant switch and sets a port flag of the local port to WAIT_ACK (operation 414). In some embodiments, sending a message includes identifying one or more local egress ports corresponding to the egress switch identifier of the message and transmitting the message via the identified port(s). The switch then receives an acknowledgement (e.g., an acknowledgement message) from a remote participant switch (operation 416). The switch checks whether an acknowledgement from a respective remote participant switch has been received (operation 418). If not, the switch continues to receive an acknowledgement from a remote participant switch (operation 416).

If the switch has received an acknowledgement from a respective remote participant switch, the switch sets the port flag to ALL_ACK (operation 420). The switch then runs the state machine for the redundant virtual link aggregation group based on the database, as described in conjunction with FIG. 2A, and determines the mode for the redundant virtual link aggregation group (operation 422). The switch marks the port status of a respective entry in the database based on the determined mode of the redundant virtual link aggregation group (operation 424). The switch identifies the local port(s) with a "selected" port status and aggregates the links coupled to the identified port(s) in the redundant virtual link aggregation group (operation 426). In some embodiments, the switch sends a confirmation message for a respective identified port to a respective remote participant switch (operation 428). This confirmation message indicates that the port is operational and ready to carry traffic for the redundant virtual link aggregation group. This confirmation message can be a fabric control message and can be sent for any link aggregation in a fabric switch.

Figure 4B:
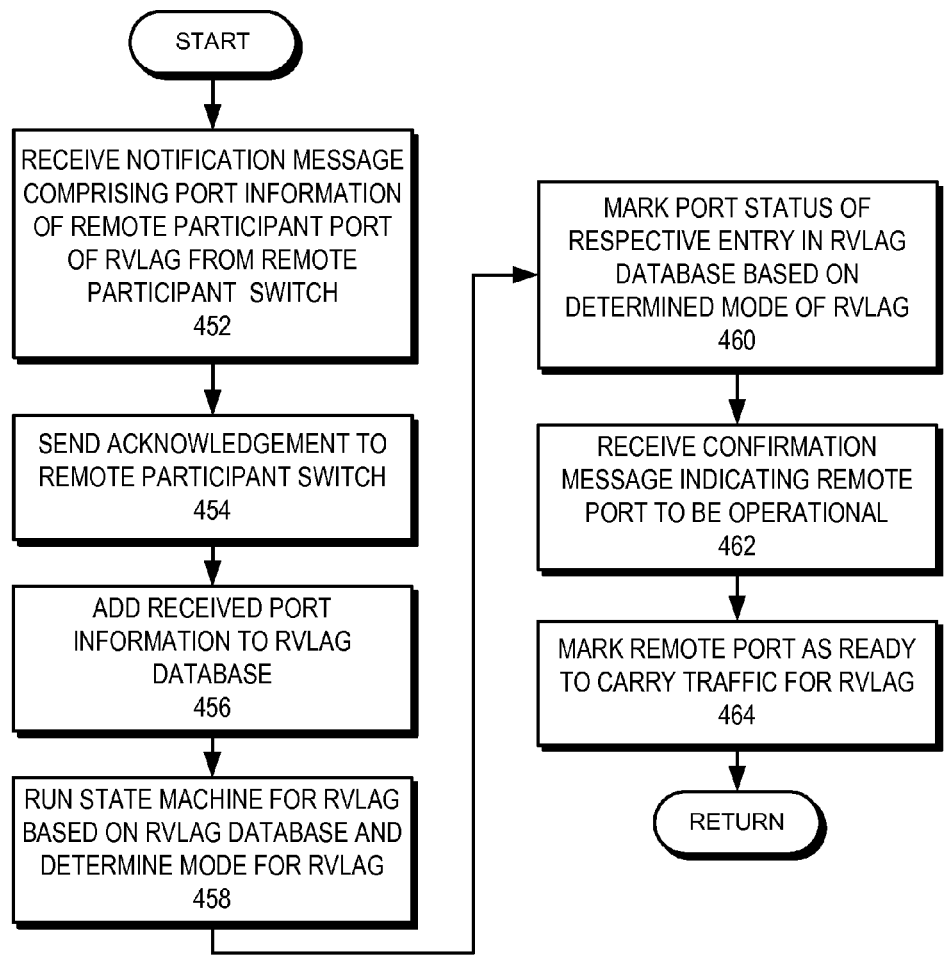
FIG. 4B presents a flowchart illustrating the process of a switch selecting an initial remote port status for a redundant virtual link aggregation group, in accordance with an embodiment of the present invention.

FIG. 4B presents a flowchart illustrating the process of a switch selecting an initial remote port status for a redundant virtual link aggregation group, in accordance with an embodiment of the present invention. During operation, the switch receives a notification message comprising port information of a remote participant port of the redundant virtual link aggregation group from a remote participant switch (operation 452). The switch sends an acknowledgement message to the remote participant switch (operation 454) and adds this received port information to the local redundant virtual link aggregation group database (operation 456). The switch then runs the state machine for the redundant virtual link aggregation group based on the database, as described in conjunction with FIG. 2A, and determines the mode for the redundant virtual link aggregation group (operation 458).

The switch identifies port status of a respective entry in the database based on the determined mode of the redundant virtual link aggregation group (operation 460). In some embodiments, the switch receives a confirmation message from the remote participant switch indicating that the remote port is operational (operation 462). Upon receiving the confirmation message, the switch can mark this remote port to be ready to carry traffic for the redundant virtual link aggregation group (operation 464). This confirmation message can be a fabric control message and can be sent for any link aggregation in a fabric switch.

High Availability

Figure 5A:
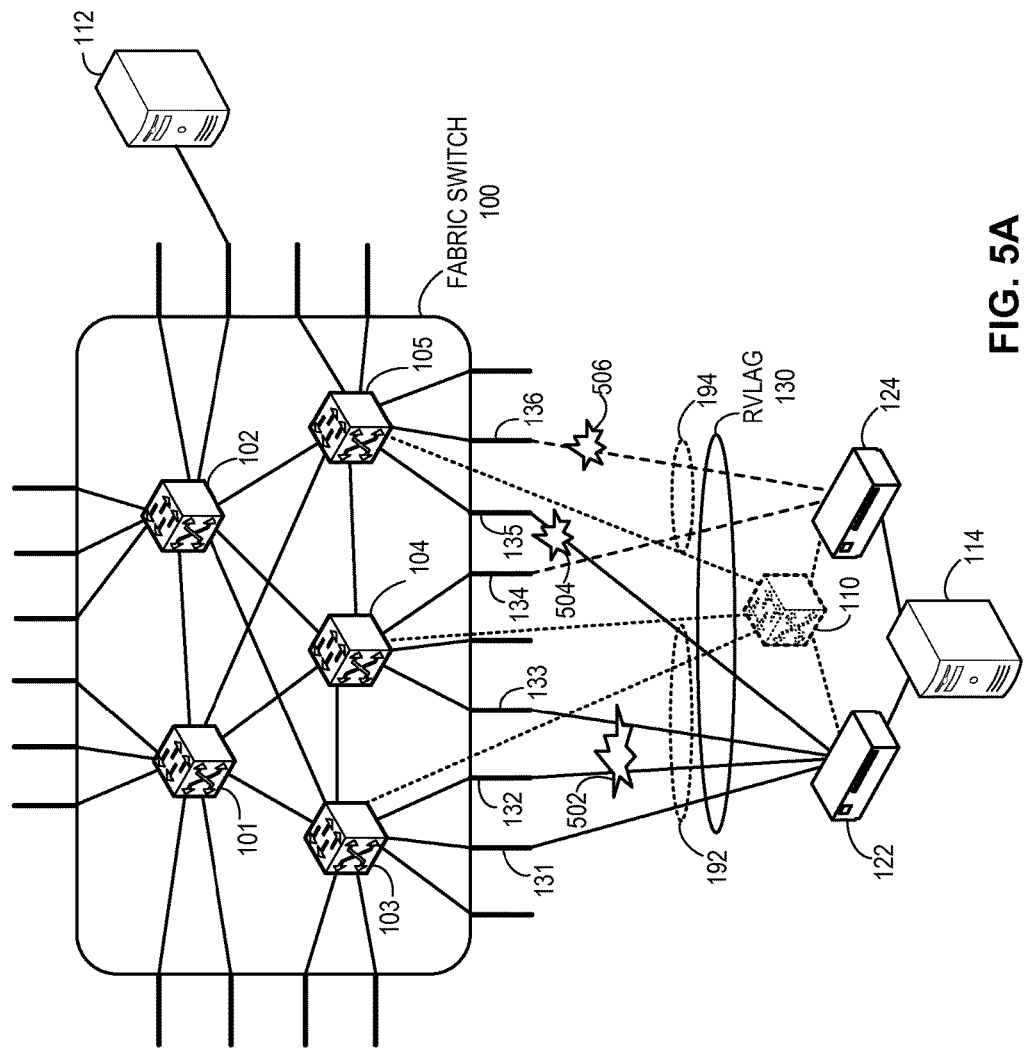
FIG. 5A illustrates exemplary high availability in a redundant virtual link aggregation group, in accordance with an embodiment of the present invention.

In the example in FIG. 1A, redundant virtual link aggregation group 130 starts to carry traffic via the links in set 194 if a minimum number of links in set 192 are not operational, thereby facilitating high availability within the group. FIG. 5A illustrates exemplary high availability in a redundant virtual link aggregation group, in accordance with an embodiment of the present invention. In this example, the protection threshold is two for redundant virtual link aggregation group 130. Suppose that a failure 502 makes the links coupled to ports 132 and 133 unavailable. Upon detecting the unavailability of the link coupled to port 132, switch 103 notifies switches 104 and 105 regarding the unavailability. In the same way, upon detecting the unavailability of the link coupled to port 133, switch 104 notifies switches 103 and 105 regarding the unavailability.

Upon detecting a local failure or being notified regarding a remote failure, switches 103, 104, and 105 individually updates their respective redundant virtual link aggregation group database. At this point, the links coupled to ports 131 and 135 remain operational. As a result, the number of operational links in set 192 does not fall below the protection threshold and the participant switches continue to forward traffic via the operational links in set 192. Under such circumstances, if end device 112 sends a packet to end device 114, switch 102 receives the packet. Switch 102 encapsulates the packet in a fabric encapsulation header (e.g., a TRILL or an IP header) and assigns the virtual switch identifier of virtual switch 110 as the egress switch identifier of the encapsulation header and forwards it to virtual switch 110.

If switch 104 receives the packet, switch 104 determines that traffic is currently being carried by the operational links in set 192 and the local switch does not have an operational link in set 192. As a result, even though switch 104 is associated with virtual switch 110 (i.e., the virtual switch identifier of switch 110 is also associated with switch 104), switch 104 does not decapsulates the encapsulation header. Instead, switch 104 identifies that both switches 103 and 105 have local ports coupled to an operational link in set 192.

Switch 104 then forwards the packet to either switch 103 or 105. Suppose that switch 103 receives the packet and determines that the local switch has port 131 coupled to an operational link in set 192. Hence, switch 103 decapsulates the encapsulation header and forwards the inner packet via port 131.

Suppose that another failure 504 makes the link coupled to port 135 unavailable. At that point, only the link coupled to port 131 remains operational in set 192. As a result, the number of operational links in set 192 has fallen below the protection threshold and set 192 does not have enough links to carry traffic to end device 122. Since the standby links (i.e., the links in set 194) are not affected by failures 502 and 504, the number of operational links in set 194 is greater than or equal to the protection threshold. Hence, the participant switches individually transition to the protection mode, as described in conjunction with FIG. 2B, and start forwarding traffic via the links in set 194. If switch 103 receives a packet destined to virtual switch 110, switch 103 determines that traffic is currently being carried by the links in set 194 and the local switch does not have a link in set 194. As a result, even though switch 103 is associated with virtual switch 110, instead of decapsulating, switch 103 identifies that both switches 104 and 105 have local ports coupled to a link in set 194. Switch 103 then forwards the packet to either switch 104 or 105. If switch 104 receives the packet, switch 104 decapsulates the encapsulation header and forwards the packet to end device 124.

At this point, since standby end device 124 has started receiving traffic, end device 124 can start operating as the active customer network device. End device 124 forwards this packet to end device 114. Upon receiving the packet, end device 114 relearns the MAC address of end device 112 via the port which couples end device 124. On the other hand, if end device 124 is associated with a virtual customer network device (e.g., based on a protection protocol, such as Virtual Router Redundancy Protocol (VRRP) or Virtual Switch Redundancy Protocol (VSRP)), upon becoming active, end device 114 relearns the MAC address of that virtual customer network device via the port which couples end device 124. In this way, when end device 114 forwards a packet to end device 112, end device 114 forwards the packet via the port which couples end device 124.

Suppose that a recovery from failure 502 makes the links coupled to ports 132 and 133 available. As a result, the number of operational links in set 192 becomes greater than or equal to the protection threshold. However, since the standby links of set 194 are currently selected and the number of operational links in set 194 is also greater than or equal to the protection threshold, the participant switches continue to forwarding traffic via the links in set 194. On the other hand, suppose that another failure 506 makes the link coupled to port 135 unavailable. At that point, the number of operational links in set 192 is greater than or equal to the protection threshold, but the number of operational links in set 194 has fallen below the protection threshold. As a result, the participant switches individually transition back to the active mode and start forwarding traffic via the operational links in set 192. These links are coupled to ports 131, 132, and 133.

FIG. 5B illustrates an exemplary data structure with selected active links in a redundant virtual link aggregation group in response to a failure, in accordance with an embodiment of the present invention. This example shows database 142 in response to failure 502, which makes ports 132 and 133 unavailable. Upon detecting a local failure 502 to port 132, switch 103 sends a notification to switches 104 and 105 regarding the unavailability of the link coupled to port 132, and waits for an acknowledgement from switches 104 and 105. Upon receiving a respective acknowledgement, switch 103 removes the entry comprising port identifier 162 of port 132 from database 142. Switch 103 runs state machine 250 based on database 142 and determines that redundant virtual link aggregation group 130 remains in active mode 270, as described in conjunction with FIG. 2B.

On the other hand, when switch 103 receives a notification from switch 104 regarding unavailability of port 133, switch 103 sends back an acknowledgement and removes the entry comprising port identifier 163 of port 133 from database 142. Switch 103 again runs state machine 250 based on database 142 and determines that redundant virtual link aggregation group 130 remains in active mode 270, as described in conjunction with FIG. 2B. As a result, the port status remains "selected" for the entries with an "active" port role and the port status remains "standby" for the entries with a "backup" port role in database 142. In the same way, switches 104, and 105 individually update their databases 144 and 146, respectively, and run state machine 250 to determine that that redundant virtual link aggregation group 130 remains in active mode 270.

FIG. 5C illustrates an exemplary data structure with selected standby links in a redundant virtual link aggregation group in response to a failure, in accordance with an embodiment of the present invention. This example shows database 142 in response to failures 502 and 504, which make ports 132, 133, and 135 unavailable. Upon detecting a local failure 504 to port 135, switch 105 sends a notification to switches 103 and 104 regarding the unavailability of the link coupled to port 135. When switch 103 receives a notification from switch 105 regarding unavailability of port 135, switch 103 sends back an acknowledgement and removes the entry comprising port identifier 165 of port 135 from database 142. Switch 103 runs state machine 250 based on database 142 and transitions redundant virtual link aggregation group 130 from active mode 270 to protection mode 280, as described in conjunction with FIG. 2B. As a result, the port status becomes "selected" for the entries with a "backup" port role and the port status becomes "standby" for the entries with an "active" port role in database 142.

FIG. 5D illustrates an exemplary data structure with selected active links in a redundant virtual link aggregation group in response to a failure recovery, in accordance with an embodiment of the present invention. This example shows database 142 in response to a recovery from failure 502, which makes ports 132 and 133 available again, and failure 506, which makes port 136 unavailable. Upon detecting a recovery from failure 502 to port 132, switch 103 sends a notification to switches 104 and 105 regarding the availability of the link coupled to port 132, and waits for an acknowledgement from switches 104 and 105. Upon receiving a respective acknowledgement, switch 103 adds an entry comprising port identifier 162 of port 132 to database 142. Switch 103 runs state machine 250 based on database 142 and determines that redundant virtual link aggregation group 130 remains in protection mode 280, as described in conjunction with FIG. 2B.

On the other hand, when switch 103 receives a notification from switch 104 regarding availability of port 133, switch 103 sends back an acknowledgement and adds an entry comprising port identifier 163 of port 133 to database 142. Switch 103 again runs state machine 250 based on database 142 and determines that redundant virtual link aggregation group 130 remains in protection mode 280, as described in conjunction with FIG. 2B. However, when switch 103 receives a notification from switch 105 regarding unavailability of port 135 due to failure 506, switch 103 removes the entry comprising port identifier 165 of port 135 from database 142. Switch 103 runs state machine 250 based on database 142 and transitions redundant virtual link aggregation group 130 from protection mode 280 to active mode 270, as described in conjunction with FIG. 2B. As a result, the port status becomes "selected" for the entries with an "active" port role and the port status becomes "standby" for the entries with a "backup" port role in database 142.

Recovery Operations

Figure 6A:
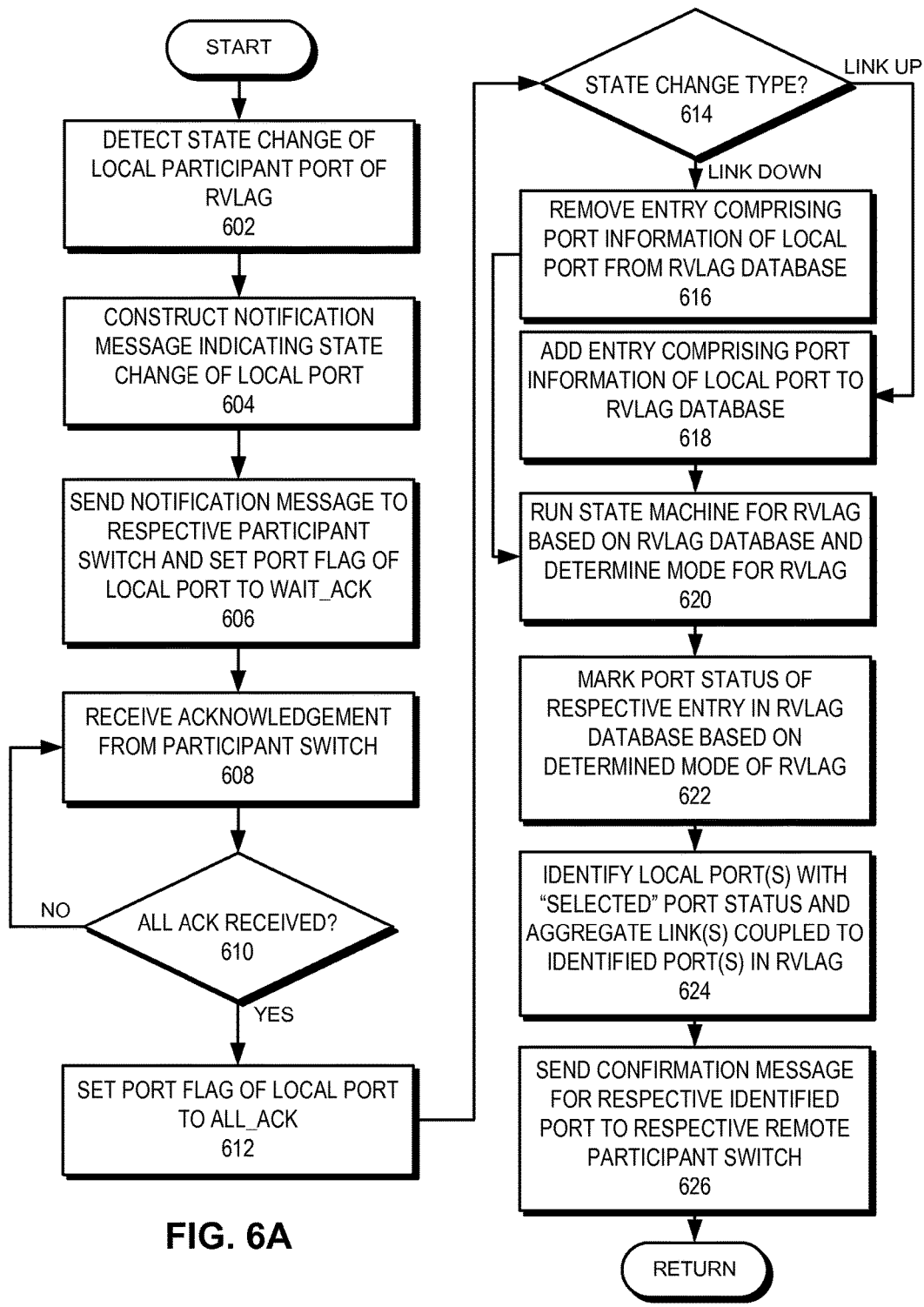
FIG. 6A presents a flowchart illustrating the process of a switch selecting a local port status for a redundant virtual link aggregation group in response to a state change, in accordance with an embodiment of the present invention.

FIG. 6A presents a flowchart illustrating the process of a switch selecting local port status for a redundant virtual link aggregation group in response to a state change, in accordance with an embodiment of the present invention. During operation, the switch detects a state change of a local participant port of a redundant virtual link aggregation group (operation 602). The switch constructs a notification message indicating the state change of the local port in its payload (operation 604). This notification message can be a fabric control message of a fabric switch. The switch then sends the notification message to a respective other participant switch and sets a port flag of the local port to WAIT_ACK (operation 606). In some embodiments, sending a message includes identifying one or more local egress ports corresponding to the egress switch identifier of the message and transmitting the message via the identified port(s).

The switch then receives an acknowledgement (e.g., an acknowledgement message) from a remote participant switch (operation 608). The switch checks whether an acknowledgement from a respective remote participant switch has been received (operation 610). If not, the switch continues to receive an acknowledgement from a remote participant switch (operation 608). If the switch has received an acknowledgement from a respective remote participant switch, the switch sets the port flag to ALL_ACK (operation 612). The switch then checks the state change type (operation 614). If it is a "link down" state change (e.g., a link has become unavailable), the switch removes the entry comprising the port information of the local participant port from the local redundant virtual link aggregation group database (operation 616). If it is a "link up" state change (e.g., a link has become available), the switch adds an entry comprising the port information of the local participant port to the local database (operation 618).

Upon removing (operation 616) or adding (operation 618) the port information, the switch runs the state machine for the redundant virtual link aggregation group based on the database, as described in conjunction with FIG. 2A, and determines the mode for the redundant virtual link aggregation group (operation 620). The switch marks the port status of a respective entry in the database based on the determined mode of the redundant virtual link aggregation group (operation 622). The switch identifies the local port(s) with a "selected" port status and aggregates the links coupled to the identified port(s) in the redundant virtual link aggregation group (operation 624). In some embodiments, the switch sends a confirmation message a respective identified port to a respective remote participant switch (operation 626). This confirmation message indicates that the port is operational and ready to carry traffic for the redundant virtual link aggregation group. This confirmation message can be a fabric control message and can be sent for any link aggregation in a fabric switch.

Figure 6B:
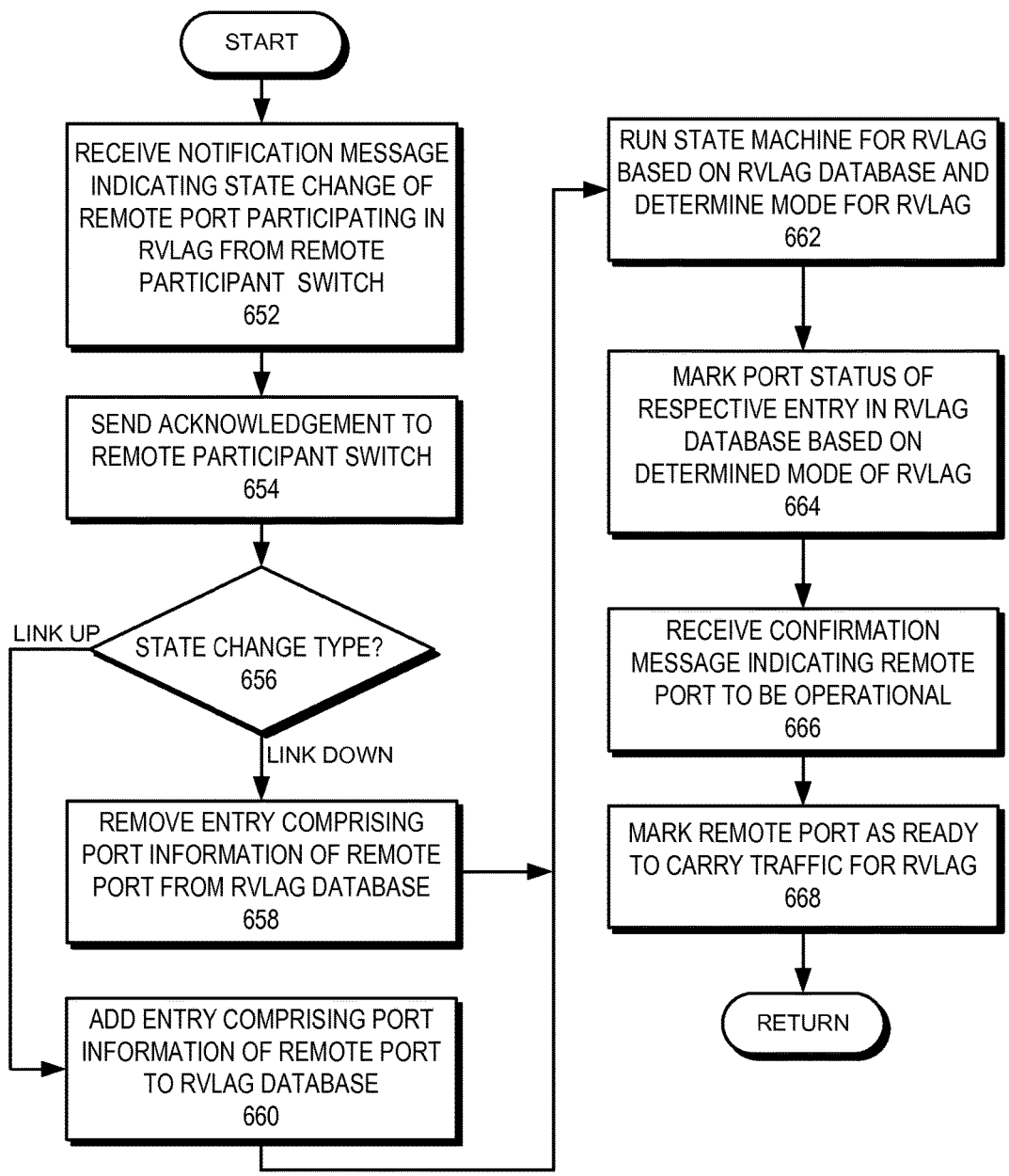
FIG. 6B presents a flowchart illustrating the process of a switch selecting a remote port status for a redundant virtual link aggregation group in response to a state change, in accordance with an embodiment of the present invention.

FIG. 6B presents a flowchart illustrating the process of a switch selecting remote port status for a redundant virtual link aggregation group in response to a state change, in accordance with an embodiment of the present invention. During operation, the switch receives a notification message indicating a state change of a remote participant port of the redundant virtual link aggregation group from a remote participant switch (operation 652). The switch sends back an acknowledgement (operation 654) and checks the state change type (operation 656). If it is a "link down" state change (e.g., a link has become unavailable), the switch removes the entry comprising the port information of the remote port from the local redundant virtual link aggregation group database (operation 658). If it is a "link up" state change (e.g., a link has become available), the switch adds an entry comprising the port information of the remote port to the local database (operation 660).

Upon removing (operation 658) or adding (operation 660) the port information, the switch runs the state machine for the redundant virtual link aggregation group based on the database, as described in conjunction with FIG. 2A, and determines the mode for the redundant virtual link aggregation group (operation 662). The switch marks the port status of a respective entry in the database based on the determined mode of the redundant virtual link aggregation group (operation 664). In some embodiments, the switch receives a confirmation message from the remote participant switch indicating that the remote port is operational (operation 666). Upon receiving the confirmation message, the switch can mark this remote port to be ready to carry traffic for the redundant virtual link aggregation group (operation 668). This confirmation message can be a fabric control message and can be sent for any link aggregation in a fabric switch.

Forwarding

Figure 7A:
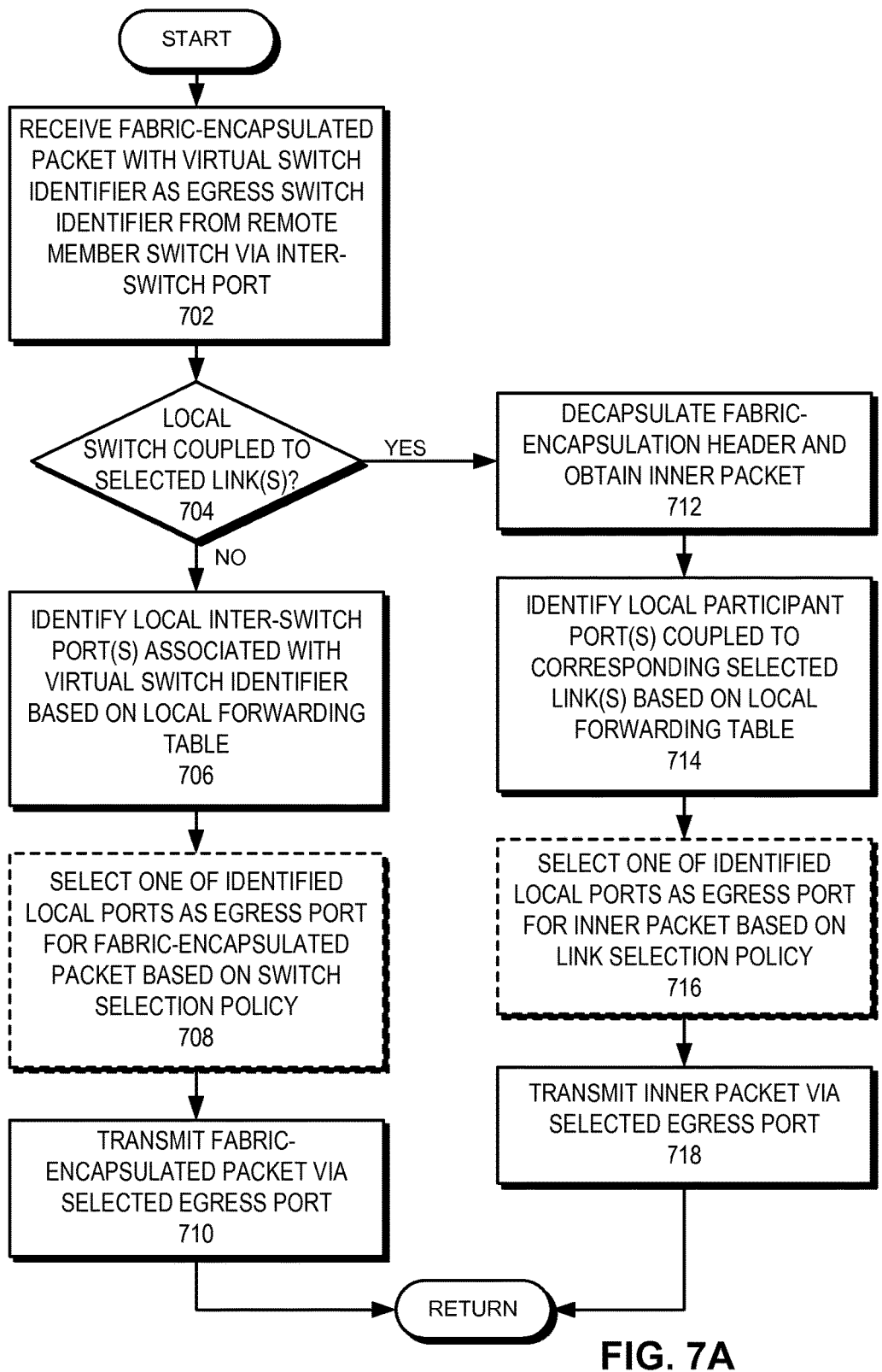
FIG. 7A presents a flowchart illustrating the process of a switch forwarding a packet received via an inter-switch port, in accordance with an embodiment of the present invention.

FIG. 7A presents a flowchart illustrating the process of a switch forwarding a packet received via an inter-switch port, in accordance with an embodiment of the present invention. During operation, the switch receives a fabric-encapsulated packet, which has a fabric-encapsulation header, with a virtual switch identifier as the egress switch identifier from a remote member switch via an inter-switch port (operation 702). This virtual switch identifier is associated with a redundant virtual link aggregation group. The fabric-encapsulated packet can be a TRILL or an IP packet and the virtual switch identifier can be a virtual RBridge identifier or a virtual IP address. The switch then checks whether the local switch is coupled to one or more selected link(s) (i.e., a link coupled to a participant port with a "selected" port role) (operation 704).

If the switch is not coupled to a selected link, the switch identifies the local inter-switch port(s) associated with the virtual switch identifier based on the local forwarding table (operation 706). In some embodiments, the switch maintains a mapping between the local inter-switch ports associated with remote participant switch(es) and the virtual switch identifier in the local forwarding table. If the switch has a plurality of remote participant switches with a "selected" port status (e.g., switch 103 in protection mode 280), the switch selects one of the identified local ports as the egress port for the fabric-encapsulated packet based on a switch selection policy (e.g., round robin, shortest distance, bandwidth, latency, hashing, etc.) (operation 708). The switch then transmits the fabric-encapsulated packet via the selected egress port (operation 710).

If the switch is coupled to a selected link, the switch decapsulates the fabric-encapsulation header and obtains the inner packet (e.g., an Ethernet frame) (operation 712). The switch identifies the local participant port(s) coupled to the corresponding selected link(s) based on the local forwarding table (operation 714). In some embodiments, the switch maintains a mapping between the local participant ports associated with the virtual switch identifier and the destination MAC address of the inner packet in the local forwarding table. If the switch has a plurality of such local ports (e.g., switch 103 in active mode 270), the switch selects one of the identified local ports as the egress port for the inner frame based on a port selection policy (e.g., round robin, bandwidth, hashing, etc.) (operation 716). The switch then transmits the inner packet via the selected egress port (operation 718).

Figure 7B:
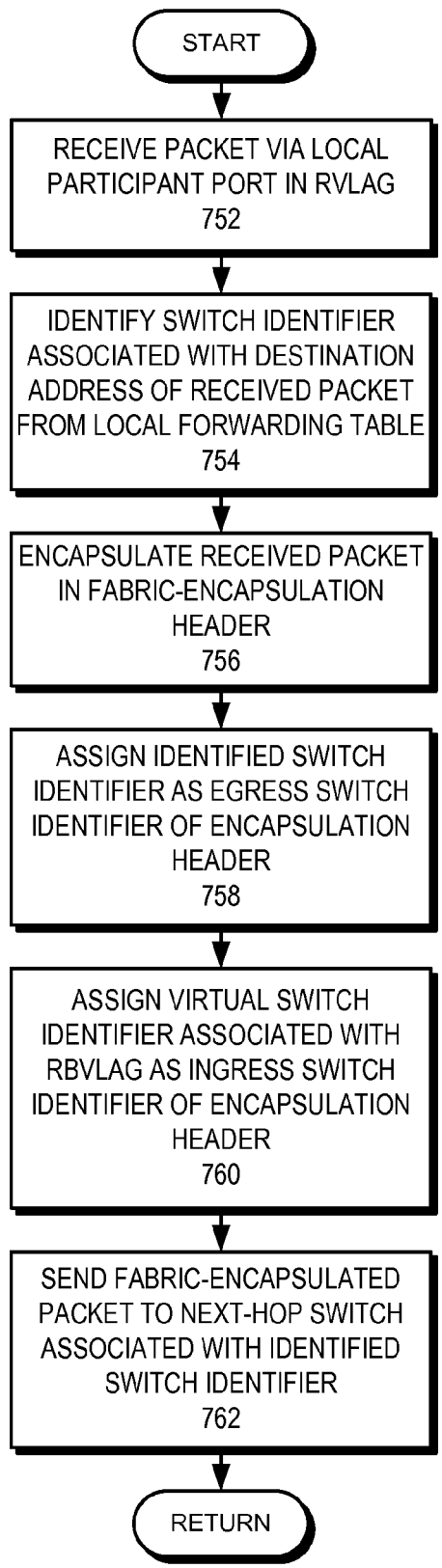
FIG. 7B presents a flowchart illustrating the process of a switch forwarding a packet received via an edge port participating in a redundant virtual link aggregation group, in accordance with an embodiment of the present invention.

FIG. 7B presents a flowchart illustrating the process of a switch forwarding a packet received via an edge port participating in a redundant virtual link aggregation group, in accordance with an embodiment of the present invention. During operation, the switch receives a packet (e.g., an Ethernet frame) via a local participant port in the redundant virtual link aggregation group (operation 752). The switch identifies a switch identifier associated with the destination address (e.g., the destination MAC address) of the received packet from the local forwarding table (operation 754). This switch identifier can be assigned to the switch from which the destination address is learned. The switch then encapsulates the received packet in a fabric-encapsulation header (operation 756) and assigns the identified switch identifier as the egress switch identifier of the encapsulation header (operation 758). The switch assigns the virtual switch identifier associated with the redundant virtual link aggregation group as the egress switch identifier of the encapsulation header (operation 760). The switch then sends the fabric-encapsulated packet to the next-hop switch associated with the identified switch identifier (operation 762). The switch can identify the next-hop switch from a local forwarding table which includes a next-hop switch for a respective member switch of a fabric switch.

Exemplary Switch

Figure 8:
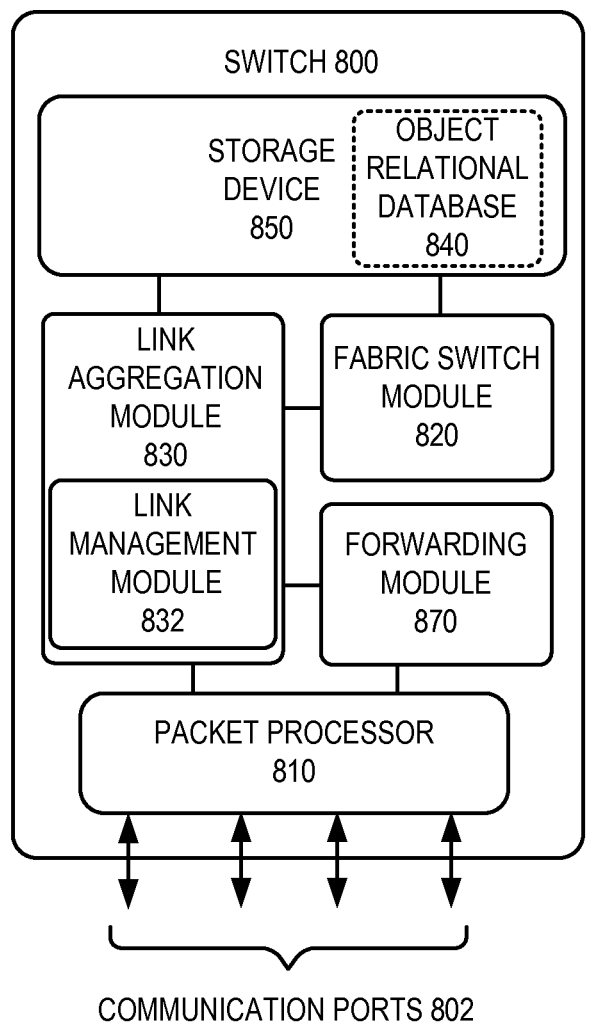
FIG. 8 illustrates an exemplary participant switch of a redundant virtual link aggregation group, in accordance with an embodiment of the present invention.

FIG. 8 illustrates an exemplary participant switch of a redundant virtual link aggregation group, in accordance with an embodiment of the present invention. Switch 800 includes a number of communication ports 802, a packet processor 810, a link aggregation module 830, a link management module 832, and a storage device 850. Switch 800 can also include switch modules (e.g., processing hardware of switch 800, such as its ASIC chips), which includes information based on which switch 800 processes packets (e.g., determines output ports for packets). Packet processor 810 extracts and processes header information from the received packets. Packet processor 810 can identify a switch identifier associated with the switch in the header of a packet.

In some embodiments, switch 800 maintains a membership in a fabric switch, as described in conjunction with FIG. 1. Switch 800 then includes a fabric switch module 820. Fabric switch module 820 maintains a configuration database in storage device 850 that maintains the configuration state of every switch within the fabric switch. Fabric switch module 820 maintains the state of the fabric switch, which is used to join other switches. Fabric switch module 820 can store configuration information associated with the fabric switch in a data structure in an object relational database 840 in storage device 850.

Communication ports 802 can include inter-switch communication channels for communication within the fabric switch. This inter-switch communication channel can be implemented via a regular communication port and based on any open or proprietary format. Communication ports 802 can also include one or more extension communication ports for communication between neighbor fabric switches. Communication ports 802 can include one or more TRILL ports capable of receiving frames encapsulated in a TRILL header. Communication ports 802 can also include one or more IP ports capable of receiving IP packets. An IP port is capable of receiving an IP packet and can be configured with an IP address. Packet processor 810 can process TRILL-encapsulated frames and/or IP packets.

During operation, link aggregation module 830 establishes a redundant virtual link aggregation group comprising a plurality of links coupled to switch 800 and one or more other participant switches. The plurality of links includes a first set of links coupling a first customer device and a second set of links coupling a second customer device, as described in conjunction with FIG. 1A. Link management module 832 determines a current mode of the redundant virtual link aggregation group, and operates the first set of links as active links carrying traffic for the redundant virtual link aggregation group and the second set of links as standby links for the first set of links. This determination is based on the current mode and a port role for one of the communication ports 802 which participates in the virtual link aggregation group.

Link management module 832 can determine the current mode by comparing a number of operational links in the first and second sets of links with a protection threshold value. In some embodiments, link management module 832 identifies an acknowledgment of a notification message from a remote participant switch. Upon receiving the acknowledgment from a respective remote participant switch, link management module 832 determines whether the first or second set of links is actively carrying traffic In some embodiments, link aggregation module 830 maintains a redundant virtual link aggregation group database for the virtual link aggregation group, as described in conjunction with FIG. 2A. A respective entry in the database is associated with a participant port and includes a port role for the port. If the port role indicates that the port is coupled to an active link and the current mode indicates that the first set of links is actively carrying traffic, link management module 832 marks the entry as selected to carry traffic. On the other hand, if the port role indicates that the port is coupled to an active link and the current mode indicates that the second set of links is actively carrying traffic, link management module 832 marks the entry as standby. Furthermore, if the current mode indicates that the second set of links is currently active, link management module 832 operates the second set of links as active links carrying traffic for the redundant virtual link aggregation group.

In some embodiments, the virtual link aggregation group is represented as a virtual switch identifier associated with switch 800 and the other participant switches, as described in conjunction with FIG. 1B. Switch 800 then includes a forwarding module 870 which determines whether a local participant port is coupled to a link carrying traffic for the redundant virtual link aggregation group. If the port is coupled to a link carrying traffic, forwarding module 870 determines the port as an egress port for the inner packet of a fabric-encapsulated packet with the virtual switch identifier as the egress switch identifier. On the other hand, if none of the communication ports 802 is coupled to an operational link carrying traffic for the redundant virtual link aggregation group, forwarding module 870 determines an inter-switch port, which corresponds to another participant switch, as an egress port for the packet.

Note that the above-mentioned modules can be implemented in hardware as well as in software. In one embodiment, these modules can be embodied in computer-executable instructions stored in a memory which is coupled to one or more processors in switch 800. When executed, these instructions cause the processor(s) to perform the aforementioned functions.

In summary, embodiments of the present invention provide a switch and a method for facilitating a redundant virtual link aggregation group. In one embodiment, the switch includes a link aggregation module and a link management module. The link aggregation module establishes a virtual link aggregation group comprising a plurality of links coupled to the switch and one or more other switches. The plurality of links includes a first set of links coupling a first end device and a second set of links coupling a second end device. The link management module determines a current mode, which indicates which of the sets of links is currently active, of the virtual link aggregation group. The link management module operates the first set of links as active links carrying traffic for the virtual link aggregation group and the second set of links as standby links for the first set of links based on the current mode and a port role of a port participating in the virtual link aggregation group. The port role indicates whether the port is coupled to an active link or a backup link.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:
1. A switch, comprising:
link aggregation circuitry configured to establish a single virtual link aggregation group (VLAG) comprising a first set of links and a second set of links, wherein
a first end device is reachable via the VLAG through the first set of links from the switch and a second switch in one hop, and
a second end device is reachable via the VLAG through the second set of links from the switch and the second switch in one hop; and
link management circuitry configured to:
determine a current mode of the VLAG by comparing a respective number of operational links in the first set of links and the second set of links with a protection threshold value, the current mode indi- cating which one of the first set of links and the second set of links is currently active in the VLAG; and operate, based on the current mode and a port role, the first set of links as active links carrying traffic for the VLAG and the second set of links as standby links for the first set of links, the port role being of a respective port participating in the VLAG and the port role indicating whether the respective port corresponds to an active link or a standby link, wherein comparing the respective number of operational links includes determining whether the number of operational links in one of the first set of links and the second set of links is lower than the protection threshold value and whether the number of operational links in another of the first and second set of links is greater than or equal to the protection threshold value.

2. The switch of claim 1, wherein the link management circuitry is further configured to:

identify an acknowledgment message from the second switch indicating that the second switch has received port information associated with a port of the switch participating in the VLAG; and in response to identifying the acknowledgment message from the second switch, select the first set of links from the first and second sets of links for actively carrying traffic.

3. The switch of claim 1, wherein the link aggregation circuitry is further configured to maintain a database for the VLAG, and a respective entry in the database is associated with a port participating the VLAG and includes a port role for the port.

4. The switch of claim 3, wherein the link management circuitry is further configured to update an indicator in a first entry, which is associated with a first port in the first set of links, in the database to indicate that the first port is selected to carry traffic, and the first port is selected to carry traffic in response to a port role of the first entry indicating that the first port corresponds to an active link and the current mode indicating that the first set of links is actively carrying traffic.

5. The switch of claim 3, wherein the link management circuitry is further configured to update an indicator in a second entry, which is associated with a second port in the second set of links, in the database to indicate that the second port is a standby port, and the second port operates as a standby port in response to a port role of the second port indicating that the second port corresponds to an active link and the current mode indicating that the first set of links is actively carrying traffic.

6. The switch of claim 1, wherein the link management circuitry is further configured to operate the second set of links as active links carrying traffic for the VLAG and the first set of links as standby links for the second set of links in response to the current mode indicating that the second set of links is currently active.

7. The switch of claim 1, wherein the VLAG is represented as a single virtual switch identifier, and wherein the virtual switch identifier is associated with the switch and the second switch.

8. The switch of claim 1, further comprising forwarding circuitry configured to:

determine whether a local port participating in the VLAG corresponds to an operational link in the first set of links; and in response to determining that the local port corresponds to an operational link in the first set of links, determine the local port as an egress port for a packet destined to the first end device.

9. The switch of claim 8, wherein the forwarding circuitry is further configured to, in response to determining that no local port corresponds to an operational link in the first set of links, determine an inter-switch port as an egress port for the packet, wherein the second switch is reachable via the inter-switch port.

10. The switch of claim 1, wherein the switch and the second switch are member switches of a network of interconnected switches, and the network of interconnected switches is identified by a fabric identifier associated with a respective member of the network of interconnected switches.

11. A method, comprising:

establishing a single virtual link aggregation group (VLAG) comprising a first set of links and a second set of links, wherein a first end device is reachable via the VLAG through the first set of links from a switch and a second switch in one hop, and a second end device is reachable via the VLAG through the second set of links from the switch and the second switch in one hop;

determining a current mode of the VLAG by comparing a respective number of operational links in the first set of links and the second set of links with a protection threshold value, the current mode indicating which one of the first set of links and die second set of links is currently active in the VLAG; and operating, based on the current mode and a port role, the first set of links as active links carrying traffic for the VLAG and the second set of links as standby links for the first set of links, the port role being of a respective port participating in the VLAG and the port role indicating whether the respective port corresponds to an active link or a standby link, wherein comparing the respective number of operational links includes determining whether the number of operational links in one of the first and second sets of links is lower than the protection threshold value and whether the number of operational links in another of the first and second set of links is greater than or equal to the threshold value.

12. The method of claim 11, further comprising:

identifying an acknowledgment message from the second switch indicating that the second switch has received port information associated with a switch port of a switch participating in the VLAG; and in response to identifying the acknowledgment message from the second switch, selecting the first set of links from the first and second sets of links for actively carrying traffic.

13. The method of claim 11, further comprising:

maintaining a database for the VLAG, wherein a respective entry in the database is associated with a port participating the VLAG and includes a port role for the port.

14. The method of claim 13, further comprising:

updating an indicator in a first entry, which is associated with a first port in the first set of links, in the database to indicate that the first port is selected to carry traffic, wherein the first port is selected to carry traffic in response to a port role of the first entry indicating that the first port corresponds to an active link and the current mode indicating that the first set of links is actively carrying traffic.

15. The method of claim 13, further comprising:

updating an indicator in a second entry, which is associated with a second port in the second set of links, in the database to indicate that the second port is a standby port, wherein the second port operate as a standby port in response to a port role of the second port indicating that the second port corresponds to an active link and the current mode indicating that the first set of links is actively carrying traffic.

16. The method of claim 11, further comprising:

operating the second set of links as active links carrying traffic for the VLAG and the first set of links as standby links for the second set of links in response to the current mode indicating that the second set of links is currently active.

17. The method of claim 11, wherein the VLAG is represented as a single virtual switch identifier, and the virtual switch identifier is associated with the switch and the second switch.

18. The method of claim 11, further comprising:

determining whether a port of the switch corresponds to an operational link in the first set of links; and in response to determining that the port corresponds to an operational link in the first set of links, determining the port as an egress port for a packet destined to the first end device.

19. The method of claim 18, further comprising:

in response to determining that no port of the switch corresponds to an operational link in the first set of links, determining an inter-switch port of the switch as an egress port for the packet, wherein the second switch is reachable via the inter-switch port.

20. The method of claim 11, wherein the switch and the second switch are member switches of a network of interconnected switches, and the network of interconnected switches is identified by a fabric identifier associated with a respective member of the network of interconnected switches.

21. A non-transitory computer-readable storage medium storing instructions that when executed by a computing system cause the computing system to perform a method, the method comprising:

establishing a single virtual link aggregation group (VLAG) comprising a first set of links and a second set of links, wherein a first end device is reachable via the VLAG through the first set of links from a switch and a second switch in one hop, and a second end device is reachable via the VLAG through the second set of links from the switch and the second switch in one hop;

determining a current mode of the VLAG by comparing a respective number of operational links in the first set of links and the second set of links with a protection threshold value, the current mode indicating which one of the first set of links and die second set of links is currently active in the VLAG; and operating, based on the current mode and a port role, the first set of links as active links carrying traffic for the VLAG and the second set of links as standby links for the first set of links, the port role being of a respective port participating in the VLAG and the port role indicating whether the respective port corresponds to an active link or a standby link, wherein comparing the respective number of operational links includes determining whether the number of operational links in one of the first set of links and the second set of links is lower than the protection threshold value and whether the number of operational links in another of the first and second set of links is greater than or equal to the threshold value.

\* \* \* \* \*